United States Patent
Murazaki

(10) Patent No.: US 12,557,447 B2
(45) Date of Patent: Feb. 17, 2026

(54) OXIDE FLUORESCENT MATERIAL AND LIGHT EMITTING DEVICE

(71) Applicant: NICHIA CORPORATION, Anan (JP)

(72) Inventor: Yoshinori Murazaki, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 573 days.

(21) Appl. No.: 18/060,395

(22) Filed: Nov. 30, 2022

(65) Prior Publication Data

US 2023/0167358 A1 Jun. 1, 2023

(30) Foreign Application Priority Data

Nov. 30, 2021 (JP) ................. 2021-193707

(51) Int. Cl.
*H10H 20/851* (2025.01)
*C09K 11/68* (2006.01)

(52) U.S. Cl.
CPC ......... *H10H 20/8512* (2025.01); *C09K 11/68* (2013.01); *C09K 11/681* (2013.01)

(58) Field of Classification Search
CPC ... C09K 11/681; C09K 11/68; H10H 20/8512
See application file for complete search history.

(56) References Cited

U.S. PATENT DOCUMENTS

| | | | |
|---|---|---|---|
| 8,405,111 B2 | 3/2013 | Fuchi et al. |
| 8,530,250 B2 | 9/2013 | Ichikawa et al. |
| 8,758,646 B2 | 6/2014 | Jia et al. |
| 8,894,882 B2 | 11/2014 | Pan et al. |
| 9,276,180 B2 | 3/2016 | Ishida et al. |
| 9,287,476 B2 | 3/2016 | Ichikawa et al. |
| 9,349,664 B2 | 5/2016 | Ishida et al. |
| 9,490,411 B2 | 11/2016 | Ichikawa et al. |
| 9,537,071 B2 | 1/2017 | Ichikawa et al. |
| 10,115,870 B2 | 10/2018 | Ichikawa et al. |
| 10,374,132 B2 | 8/2019 | Kumano et al. |
| 10,411,170 B2 | 9/2019 | Tragl et al. |
| 10,573,788 B2 | 2/2020 | Ichikawa et al. |
| 10,573,789 B2 | 2/2020 | Ichikawa et al. |
| 10,700,241 B2 | 6/2020 | Ichikawa et al. |
| 11,094,854 B2 | 8/2021 | Ichikawa et al. |
| 11,560,516 B2 | 1/2023 | Hong |
| 2011/0210354 A1 | 9/2011 | Ichikawa et al. |
| 2011/0260194 A1 | 10/2011 | Fuchi et al. |
| 2012/0119143 A1 | 5/2012 | Jia et al. |
| 2012/0261617 A1 | 10/2012 | Pan et al. |
| 2013/0099163 A9 | 4/2013 | Pan et al. |
| 2014/0084320 A1 | 3/2014 | Ichikawa et al. |
| 2014/0131753 A1 | 5/2014 | Ishida et al. |
| 2015/0340577 A1 | 11/2015 | Ishida et al. |
| 2016/0049566 A1 | 2/2016 | Ichikawa et al. |
| 2016/0056357 A1 | 2/2016 | Ichikawa et al. |
| 2017/0141273 A1 | 5/2017 | Ichikawa et al. |
| 2017/0186920 A1 | 6/2017 | Kumano et al. |
| 2018/0301600 A1 | 10/2018 | Ichikawa et al. |
| 2018/0358514 A1* | 12/2018 | Tragl ................ H10H 20/8512 |
| 2019/0035981 A1 | 1/2019 | Ichikawa et al. |
| 2019/0088825 A1 | 3/2019 | Ichikawa et al. |
| 2020/0205415 A1 | 7/2020 | Okura et al. |
| 2020/0287096 A1 | 9/2020 | Ichikawa et al. |
| 2021/0336094 A1 | 10/2021 | Ichikawa et al. |

FOREIGN PATENT DOCUMENTS

| | | |
|---|---|---|
| CN | 108231979 A | 6/2018 |
| JP | 2010062272 A | 3/2010 |
| JP | 2014112635 A | 6/2014 |
| JP | 2017117912 A | 6/2017 |
| JP | 2018518046 A | 7/2018 |
| JP | 2020528486 A | 9/2020 |
| WO | 2009134507 A2 | 11/2009 |
| WO | 2010055831 A1 | 5/2010 |

(Continued)

OTHER PUBLICATIONS

Zhuang, Yixi, "A brief review on red to near-infrared persistent luminescence in transition-metal-activated phosphors", Y. Zhuang et al. A brief review on red to near-infrared persistent luminescence in transition-metal-activated phosphors, Optical Materials, Sep. 2014, vol. 36, No. 11, 1907-1912.

(Continued)

*Primary Examiner* — C Melissa Koslow
(74) *Attorney, Agent, or Firm* — Hunton Andrews Kurth LLP

(57) ABSTRACT

To provide an oxide fluorescent material that has a light emission peak wavelength in a wavelength range of from red light to near infrared light. The oxide fluorescent material has a composition encompassed in a compositional formula represented by the following formula (1):

$$(Li_{1-t}M^1_t)_u(Ga_{1-v}M^2_v)_5O_w:Cr_x,Ni_y,M^3_z, \quad (1)$$

wherein in the formula (1), $M^1$ represents at least one kind of an element selected from the group consisting of Na, K, Rb, and Cs; $M^2$ represents at least one kind of an element selected from the group consisting of B, Al, Sc, In, and a rare earth element; $M^3$ represents at least one kind of an element selected from the group consisting of Si, Ge, Sn, Ti, Zr, Hf, Bi, V, Nb, and Ta; and t, u, v, w, x, y, and z each satisfy $0 \le t \le 1.0$, $0.7 \le u \le 1.6$, $0 \le v < 1.0$, $7.85 \le w \le 11.5$, $0.05 \le x \le 1.2$, $0 \le y \le 0.5$, $0.25 < x+y \le 1.2$, $y < x$, and $0 \le z \le 0.5$.

8 Claims, 15 Drawing Sheets

(56) References Cited

FOREIGN PATENT DOCUMENTS

| WO | 2011035294 A2 | | 3/2011 |
| WO | WO 2011/035294 | * | 3/2011 |
| WO | 2018207703 A1 | | 11/2018 |

OTHER PUBLICATIONS

De Clercq, O. Q. et al., Probing the local structure of the near-infrared emitting persistent phosphor LiGa5O8:Cr3+, Journal of Materials Chemistry C: Materials for Optical and Electronic Devices, (2017), vol. 5, No. 41, p. 10861-10868, D0i 10.1039/C7TC02699D.
Xiong, P. et al., Self-Recoverable Mechanically Induced Instant Luminescence from Cr3+-Doped LiGa5O8, Advanced Functional Materials, (2021), vol. 31, No. 19, 2010685, DOI 10. 1002/adfm. 202010685.

\* cited by examiner

OXIDE FLUORESCENT MATERIAL AND LIGHT EMITTING DEVICE

CROSS-REFERENCE TO RELATED PATENT APPLICATION

This application claims priority to Japanese Patent Application No. 2021-193707, filed on Nov. 30, 2021, the disclosures of which is incorporated herein references in its entirety.

BACKGROUND

Technical Field

The present disclosure relates to an oxide fluorescent material and a light emitting device.

Description of Related Art

A light emitting device having a light emission intensity in a wavelength range of from red light to near infrared light is expected to be used, for example, in an infrared camera, infrared communication, vein authentication, which is one kind of biometric authentication, a food ingredient analyzer measuring the sugar content of foods, such as fruit and vegetables, in a non-destructive manner, and the like.

Examples of the light emitting device include a light emitting device including a combination of a light emitting diode (LED) and a fluorescent material.

Examples of the fluorescent material to be combined in the light emitting device include a fluorescent material that has a relatively large light emission intensity of a light emission spectrum in a wavelength range of from red light to near infrared light (which may be hereinafter referred to as a "near infrared light emitting fluorescent material"). In this specification, the "fluorescent material" is used in the same meaning as a "fluorescent phosphor".

Japanese Unexamined Patent Publication No. 2020-528486 describes a fluorescent material that has a light emission peak wavelength in a wavelength range of 680 nm or more and 760 nm or less and has a composition represented by $CaYAlO_4:Mn^{4+}$. As the fluorescent material favorable for the aforementioned applications, for example, a near infrared light emitting fluorescent material that has a larger full width at half maximum and a light emission spectrum having a light emission peak wavelength in a longer wavelength range may be demanded in some cases.

SUMMARY

An object of the present disclosure is to provide an oxide fluorescent material that has a light emission peak wavelength in a wavelength range of from red light to near infrared light, has a larger full width at half maximum of a light emission spectrum, and has higher light emission energy and a light emitting device using the same.

A first embodiment relates to an oxide fluorescent material having a composition encompassed in a compositional formula represented by the following formula (1):

(1)

wherein in the formula (1), $M^1$ represents at least one kind of an element selected from the group consisting of Na, K, Rb, and Cs; $M^2$ represents at least one kind of an element selected from the group consisting of B, Al, Sc, In, and a rare earth element; $M^3$ represents at least one kind of an element selected from the group consisting of Si, Ge, Sn, Ti, Zr, Hf, Bi, V, Nb, and Ta; and t, u, v, w, x, y, and z each satisfy $0 \le t \le 1.0$, $0.7 \le u \le 1.6$, $0 \le v < 1.0$, $7.85 \le w \le 11.5$, $0.05 \le x \le 1.2$, $0 \le y < 0.5$, $0.25 < x+y \le 1.2$, $y < x$, and $0 \le z \le 0.5$.

A second embodiment relates to a light emitting device including the oxide fluorescent material and a light emitting element that has a light emission peak wavelength in a range of 365 nm or more and 500 nm or less and irradiates the oxide fluorescent material.

According to the present disclosure, an oxide fluorescent material that has a light emission peak wavelength in a wavelength range of from red light to near infrared light, has a larger full width at half maximum of a light emission spectrum, and has higher light emission energy and a light emitting device can be provided.

DETAILED DESCRIPTION

Figure 1:
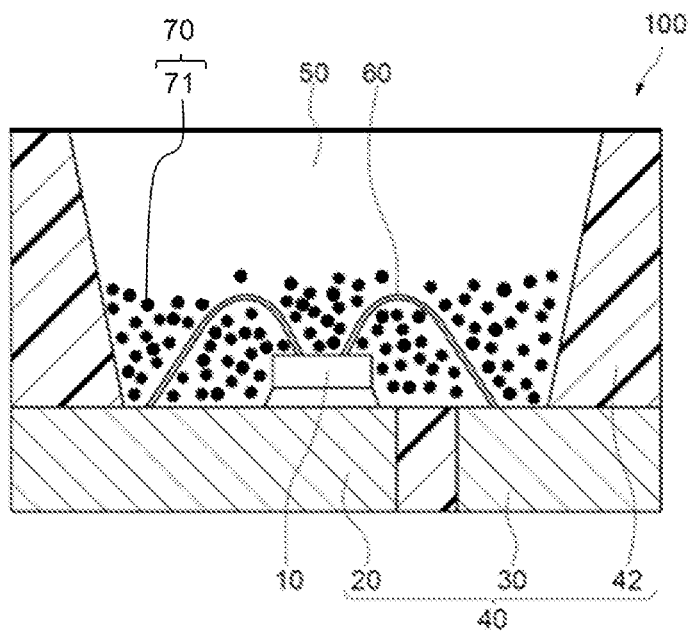
FIG. 1 is a schematic cross sectional view showing an example of the first constitutional example of the light emitting device.

The oxide fluorescent material and the light emitting device according to the present disclosure will be described below. However, the embodiments shown below are examples for practicing the technical concept of the present invention, and the present invention is not limited to the oxide fluorescent materials and the light emitting devices shown below. As for the visible light, the relationships between the color names and the chromaticity coordinates, the relationships between the wavelength ranges of light and the color names of monochromatic light, and the like, for example, the wavelength range of red light, are in accordance with JIS Z8110.

A light emitting device using a fluorescent material is demanded to emit light having an optimum wavelength range corresponding to the view target and the use condition. For example, in the medical front, there may be a demand of conveniently acquiring the information in the living body. The living body includes light absorbers, such as water, hemoglobin, and melanin. For example, hemoglobin has a high absorbance to light in a wavelength range of visible light having a wavelength of less than 650 nm, and a light emitting device emitting light in the wavelength range of visible light is difficult to acquire the information in the living body since light in the wavelength range of visible light is difficult to transmit inside the living body. Accordingly there is a wavelength range referred to as a "near infrared window in biological tissue" which enables light to easily transmit through the living body. There may be a demand of a light emitting device that emits light having a wavelength range including at least a part of the "near infrared window in biological tissue", for example, a wavelength range of near infrared light of 650 nm or more and 1,050 nm or less. For example, in the case where the increase and decrease of the oxygen level in the blood in the living body can be measured from the increase and decrease of the light absorption of hemoglobin bonded to oxygen, the information in the living body can be conveniently acquired through irradiation of light from the light emitting device. Accordingly as the fluorescent material used in the light emitting device, there may be a demand of a fluorescent material that absorbs light from an excitation light source, and emits, for example, light having a wavelength range including a part of near infrared light in a range of 650 nm or more and 1,050 nm or less.

For example, in the food field, there is a demand of a non-destructive saccharimeter capable of measuring the sugar content of fruit and vegetables, a non-destructive taste analyzer of rice. As a non-destructive method of measuring the internal qualities of fruit and vegetables, such as the sugar content, the acid level, the maturity and the internal damage, and the surface qualities of fruit and vegetables appearing on the fruit skin surface or in the fruit skin surface layer near the fruit skin surface, such as abnormal dryness, a near infrared spectroscopy using near infrared light having a wavelength of 700 nm or more and 2,500 nm or less may be used in some cases. In the infrared spectroscopy light having a wavelength range of near infrared light is irradiated onto fruit and vegetables, and the transmitted light through the fruit and vegetables or the reflected light reflected by the fruit and vegetables is received to measure the qualities of the fruit and vegetables through the decrease of the light intensity (i.e., the absorption of light). An analyzer of the near infrared spectroscopy of this type used in the food field uses such a light source as a tungsten lamp or a xenon lamp.

Oxide Fluorescent Material

The oxide fluorescent material has a composition encompassed in a compositional formula represented by the following formula (1):

(1)

wherein the formula (1), $M^1$ represents at least one kind of an element selected from the group consisting of Na, K, Rb, and Cs; $M^2$ represents at least one kind of an element selected from the group consisting of B, Al, Sc, In, and a rare earth element; $M^3$ represents at least one kind of an element selected from the group consisting of Si, Ge, Sn, Ti, Zr, Hf, Bi, V, Nb, and Ta; and t, u, v, w, x, y, and z each satisfy $0 \le t \le 1.0$, $0.7 \le u \le 1.6$, $0 \le v < 1.0$, $7.85 \le w \le 11.5$, $0.05 \le x \le 1.2$, $0 \le y \le 0.5$, $0.25 < x+y \le 1.2$, $y < x$, and $0 \le z \le 0.5$. The oxide fluorescent material absorbs the excitation light, and can emit light that has a wide wavelength range including a part of a wavelength range of near infrared light, has a large full width at half maximum of the light emission spectrum, and has higher light emission energy capable of measuring the internal information of the living body and the internal information of fruit and vegetables. In the description herein, the "molar ratio" means a ratio of an element in one mol of the chemical composition of the fluorescent material unless otherwise indicated. In the description herein, the plural elements described by delimiting with the comma (,) in the compositional formula mean that at least one kind of an element among the plural elements is contained in the composition. In the description herein, the term before the colon (:) in the compositional formula showing the composition of the fluorescent material shows the elements constituting the base crystal and the molar ratios thereof, and the term after the colon (:) therein shows the activator element.

In the composition encompassed in the compositional formula represented by the formula (1), it is preferred that the oxide fluorescent material contains at least Cr as the activator element and contains both Cr and Ni as co-activator elements. In the case where both Cr and Ni are contained as the co-activator elements, Cr absorbs the energy of the excitation light, and the energy absorbed by Cr is transferred to Ni to excite Ni efficiently, enabling emission of light that has a light emission spectrum having a large full width at half maximum in a wavelength range of near infrared light. In one mol of the composition encompassed in the compositional formula represented by the formula (1), x represents the molar ratio of Cr, and y represents the molar ratio of Ni. In the formula (1), x and y preferably satisfy $0 < y \le 0.5$ and $1.5 \le x/y \le 50$. The oxide fluorescent material having a composition encompassed in the compositional formula represented by the formula (1) can emit light that has a light emission spectrum having a large full width at half maximum in a wavelength range of near infrared light since the molar ratio of Cr is larger than the molar ratio of Ni, and the absorption of the excitation light by Cr is large to excite Ni efficiently. In the formula (1), x and y may satisfy $2.0 \le x/y \le 40$, may satisfy $2.5 \le x/y \le 30$, and may satisfy $2.8 \le x/y \le 25$. In the formula (1), x and y may satisfy $0.26 \le x+y \le 1.2$.

In the composition encompassed in the compositional formula represented by the formula (1), the variable x showing the molar ratio of Cr as the activator element satisfies $0.05 \le x \le 1.2$, preferably satisfies $0.08 \le x \le 0.8$, and more preferably satisfies $0.1 \le x \le 0.5$. In the oxide fluorescent material containing Cr as the activator element, Cr absorbs the excitation light, and depending on the intensity of the crystal field of the base crystal, there are a case where the oxide fluorescent material emits light like $Al_2O_3$ (ruby) having a light emission peak wavelength around 696 nm, and a case where the oxide fluorescent material emits light like $BeAl_2O_4$ (alexandrite) having a light emission peak wavelength in a range of 700 nm to 815 nm included in the wavelength range of near infrared light.

In the composition encompassed in the compositional formula represented by the formula (1), in the case where Ni is not contained, i.e., in the case where y=0, the oxide fluorescent material emits light having a light emission peak wavelength in a range of 700 nm or more and 900 nm or less and a light emission spectrum having a relatively large full width at half maximum.

In the composition encompassed in the compositional formula represented by the formula (1), the variable y showing the molar ratio of Ni as the activator element along with Cr satisfies $0 \leq y \leq 0.5$, may satisfy $0 < y \leq 0.5$, may satisfy $0.001 \leq y \leq 0.3$, and may satisfy $0.005 \leq y \leq 0.2$. The oxide fluorescent material containing Ni as the co-activator element has a complicated light emission spectrum due to the multiple energy levels of Ni, and emits light having a light emission peak wavelength having a large full width at half maximum in the wavelength range of near infrared light.

In the oxide fluorescent material having the composition encompassed in the compositional formula represented by the formula (1), the total of Cr and Ni is preferably more than 5% by mol, and more preferably in a range of 5.01% by mol or more and 24% by mol or less, based on the total molar number of Ga and the element $M^2$ as 100% by mol. In the oxide fluorescent material having the composition encompassed in the compositional formula represented by the formula (1), in the case where the total of Cr and Ni is more than 5% by mol based on the total molar number of Ga and the element $M^2$ as 100% by mol, the oxide fluorescent material emits light having a light emission spectrum having a large full width at half maximum in the wavelength range of near infrared light.

In the composition encompassed in the compositional formula represented by the formula (1), the first element $M^1$ may be at least one kind of an element selected from the group consisting of Na, K, and Rb. In the composition encompassed in the compositional formula represented by the formula (1), the molar ratio of the first element $M^1$ contained depending on necessity is shown by the product of the variable t and the variable u assuming that the molar ratio of Ga or the total molar ratio of the second element $M^2$ and Ga in the case where the second element $M^2$ is contained is 5 per one mol of the composition of the oxide fluorescent material, in which the variable t may satisfy $0 \leq t \leq 0.8$, and may satisfy $0 \leq t \leq 0.5$, and the variable u may satisfy $0.8 \leq u \leq 1.5$, may satisfy $0.9 \leq u \leq 1.2$, and may satisfy u=1.

In the composition encompassed in the compositional formula represented by the formula (1), the second element $M^2$ may be at least one element selected from the group consisting of B, Al, Sc, In, Y, La, Ce, Pr, Nd, Pm, Sm, Eu, Gd, Tb, Dy, Ho, Er, Tm, Yb, and Lu, and the second element $M^2$ may be at least one element selected from the group consisting of Al, Sc, In, and a rare earth element. The molar ratio of the second element $M^2$ contained depending on necessity is shown by the product of the variable v and 5 assuming that the molar ratio of Ga or the total molar ratio of the second element $M^2$ and Ga in the case where the second element $M^2$ is contained is 5 per one mol of the composition of the oxide fluorescent material, in which the variable v may satisfy $0 \leq v \leq 0.8$, may satisfy $0 \leq v \leq 0.5$, and may satisfy $0 \leq v \leq 0.3$.

In the composition encompassed in the compositional formula represented by the formula (1), the variable w showing the molar ratio of O (oxygen) contained in the oxide fluorescent material assuming that the molar ratio of Ga or the total molar ratio of the second element $M^2$ and Ga in the case where the second element $M^2$ is contained is 5 per one mol of the composition of the oxide fluorescent material satisfies $7.85 \leq w \leq 11.5$, may satisfy $7.9 \leq w \leq 11.0$, may satisfy $7.95 \leq w \leq 10.5$, and may be w=8.

In the composition encompassed in the compositional formula represented by the formula (1), the variable z showing the molar ratio of the third element $M^3$ per one mol of the composition of the oxide fluorescent material satisfies $0 \leq z \leq 0.5$, may satisfy $0 \leq z \leq 0.3$, and may satisfy $0 \leq z \leq 0.2$.

The oxide fluorescent material having a composition encompassed in the compositional formula represented by the formula (1) preferably has a full width at half maximum of the light emission spectrum having the light emission peak wavelength of 150 nm or more. The full width at half maximum of the light emission spectrum having the light emission peak wavelength of the oxide fluorescent material having a composition encompassed in the compositional formula represented by the formula (1) is preferably 160 nm or more, more preferably 170 nm or more, and further preferably 180 nm or more. The oxide fluorescent material preferably has a larger full width at half maximum of the light emission spectrum having the light emission peak wavelength. The full width at half maximum of the light emission spectrum having the light emission peak wavelength may be 250 nm or less, may be 240 nm or less, may be 230 nm or less, and may be 220 nm or less. In the description herein, the full width at half maximum means the wavelength width at a light emission intensity of 50% with respect to the light emission intensity at the light emission peak wavelength showing the maximum light emission intensity in the light emission spectrum. For example, for measuring a fine propagation behavior of light in the blood of the living body it is preferred that light having a light emission spectrum having a large full width at half maximum is irradiated in the living body since the light is absorbed and scattered in the living body. For acquiring the information inside foods, such as fruit and vegetables or rice, through non-destructive measurement of the foods, it is also preferred that light having a light emission spectrum having a large full width at half maximum is irradiated. The light having a light emission spectrum having a large full width at half maximum preferably has the light emission spectrum having the light emission peak wavelength that has a larger area, which is a value obtained by integrating the region surrounded by the base line showing a light emission intensity of 0 and the curve of the light emission spectrum having the light emission intensity within the particular wavelength range, from the standpoint of achieving high light emission energy of the oxide fluorescent material. The light emission intensity in the light emission spectrum may be shown by a relative light emission intensity ratio based on the light emission intensity of the excitation light in some cases.

The oxide fluorescent material having a composition encompassed in the compositional formula represented by the formula (1) preferably has a light emission peak wavelength in a range of 1,150 nm or more and 1,300 nm or less, and more preferably has a light emission peak wavelength in a range of 1,200 nm or more and 1,300 nm or less. In the case where the oxide fluorescent material having a composition encompassed in the compositional formula represented by the formula (1) does not contain Ni, i.e., in the case where y=0, the oxide fluorescent material preferably has a light emission peak wavelength in a range of 700 nm or more and 900 nm or less, and more preferably has a light emission peak wavelength in a range of 710 nm or more and 850 nm or less. The oxide fluorescent material having a light emission peak wavelength in a range that overlaps a wavelength range of 700 nm or more and 2,500 nm or less can provide a light emitting device that can facilitate, for example, the acquirement of the information inside the living body or the information of fruit and vegetables in a non-destructive manner.

Light Emitting Device

The light emitting device includes the oxide fluorescent material having a composition encompassed in the compositional formula represented by the formula (1) and a light emitting element that has a light emission peak wavelength in a range of 365 nm or more and 500 nm or less and irradiates the oxide fluorescent material. The oxide fluorescent material may also be used as a member constituting a wavelength conversion member along with a translucent material.

The light emitting device preferably includes, as the light emitting element irradiating the oxide fluorescent material, an LED chip or an LD chip using, for example, a nitride based semiconductor.

The light emitting element preferably has a light emission peak wavelength in a range of 365 nm or more and 500 nm or less, more preferably has a light emission peak wavelength in a range of 370 nm or more and 490 nm or less, and further preferably has a light emission peak wavelength in a range of 375 nm or more and 480 nm or less. The use of the light emitting element as the excitation light source of the oxide fluorescent material enables to constitute a light emitting device emitting mixed light having a target wavelength range of the light from the light emitting element and the fluorescent light from the fluorescent material containing the oxide fluorescent material. The full width at half maximum of the light emission peak in the light emission spectrum of the light emitting element may be, for example, 30 nm or less. The light emitting element used is preferably for example, a light emitting element using a nitride based semiconductor. The use of the light emitting element using a nitride based semiconductor as the excitation light source enables to achieve a light emitting device that has a high efficiency shows output with a high linearity with respect to input, and is stable with high resistance against mechanical impacts.

The light emitting device necessitates a first fluorescent material containing the oxide fluorescent material described above, and may contain a different fluorescent material therefrom. The light emitting device preferably contains, in addition to the first fluorescent material, at least one of a fluorescent material selected from the group consisting of a second fluorescent material having a light emission peak wavelength in a range of 420 nm or more and less than 495 nm in the light emission spectrum thereof, a third fluorescent material having a light emission peak wavelength in a range of 495 nm or more and less than 590 nm in the light emission spectrum thereof, a fourth fluorescent material having a light emission peak wavelength in a range of 590 nm or more and less than 700 nm in the light emission spectrum thereof, and a fifth fluorescent material having a light emission peak wavelength in a range of 700 nm or more and 1,050 nm or less in the light emission spectrum thereof. The light emitting device that necessitates the first fluorescent material containing the oxide fluorescent material described above and contains a different fluorescent material therefrom can provide a light emission spectrum that is continuous in a range of the light emission peak wavelength of the light emitting element or more and 1,600 nm or less. The fact that the light emission spectrum of the light emitting device is continuous in a range of the light emission peak wavelength of the light emitting element or more and 1,600 nm or less means that the light emission intensity of the light emission spectrum does not become 0% within a wavelength range of the light emission peak wavelength of the light emitting element or more and 1,600 nm or less, and the light emission spectrum is continuous without interruption over the wavelength range. There are cases where a light source that emits light having a light emission spectrum continuous within a wavelength range including a part of the range of from visible light to near infrared light is necessary corresponding to the measurement target or the inspection target, such as the living body, and fruit and vegetables. The use of a tungsten lamp or a xenon lamp as the light source can emit light having a continuous light emission spectrum without interruption of the light emission spectrum over the wavelength range including a part of the range of from visible light to near infrared light. However, the device is difficult to reduce in size by the use of a tungsten lamp or a xenon lamp as the light source. The light emitting device that emits light having a light emission spectrum that is continuous over the range of the light emission peak wavelength of the light emitting element or more and 1,600 nm or less can be reduced in size as compared to the light emitting device using a tungsten lamp or a xenon lamp as the light source. A light emitting device having a reduced size can be mounted on a small sized mobile equipment, such as a smartphone, and can be used for managing the physical condition by acquiring the information inside the living body. The "range of the light emission peak wavelength of the light emitting element or more and 1,600 nm or less" means, for example, a range of 450 nm or more and 1,600 nm or less in the case where the light emission peak wavelength of the light emitting element is 450 nm.

The light emitting device has a continuous light emission spectrum over the range of the light emission peak wavelength of the light emitting element or more and 1,600 nm or less, and emits light in a wide wavelength range of from visible light to near infrared light. The light emitting device of this type can be used as the reflectance spectroscopic measurement equipment and enables the non-destructive measurement of the living body or fruit and vegetables, and also can be used in an illumination equipment that is demanded to emit light excellent in color rendering property.

The second fluorescent material having a different composition from the first fluorescent material containing the oxide fluorescent material described above preferably contains at least one kind of a fluorescent material selected from the group consisting of a phosphate salt fluorescent material having a composition encompassed in a compositional formula represented by the following formula (2a), an aluminate salt fluorescent material having a composition encompassed in a compositional formula represented by the following formula (2b), and an aluminate salt fluorescent material having a composition encompassed in a compositional formula represented by the following formula (2c), and may contain two or more kinds of fluorescent materials.

$$(Ca,Sr,Ba,Mg)_{10}(PO_4)_6(F,Cl,Br,I)_2:Eu \quad (2a)$$

$$(Ba,Sr,Ca)MgAl_{10}O_{17}:Eu \quad (2b)$$

$$Sr_4Al_{14}O_{25}:Eu \quad (2c)$$

The third fluorescent material preferably contains at least one kind of a fluorescent material selected from the group consisting of a silicate salt fluorescent material having a composition encompassed in a compositional formula represented by the following formula (3a), an aluminate salt fluorescent material or a gallate salt fluorescent material having a composition encompassed in a compositional formula represented by the following formula (3b), a ß—SiAlON fluorescent material having a composition encompassed in a compositional formula represented by the following formula (3c), a cesium lead halide fluorescent material having a composition encompassed in a compositional formula represented by the following formula (3d), and a nitride fluorescent material having a composition encompassed in a compositional formula represented by the following formula (3e), and may contain two or more kinds of fluorescent materials. In the case where the third fluorescent material contains two or more kinds of fluorescent materials, the two or more kinds of the third fluorescent materials preferably have light emission peak wavelengths in different ranges that are both in a range of 495 nm or more and less than 610 nm.

$$(Ca,Sr,Ba)_8MgSi_4O_{16}(F,Cl,Br)_2:Eu \tag{3a}$$

$$(Lu,Y,Gd,Tb)_3(Al,Ga)_5O_{12}:Ce \tag{3b}$$

$$Si_{6-z}Al_zO_zN_{8-z}:Eu(0<z\leq 4.2) \tag{3c}$$

$$CsPb(F,Cl,Br)_3 \tag{3d}$$

$$(La,Y,Gd)_3Si_6N_{11}:Ce \tag{3e}$$

The fourth fluorescent material preferably contains at least one kind of a fluorescent material selected from the group consisting of a nitride fluorescent material having a composition encompassed in a compositional formula represented by the following formula (4a), a fluorogermanate salt fluorescent material having a composition encompassed in a compositional formula represented by the following formula (4b), an oxynitride fluorescent material having a composition encompassed in a compositional formula represented by the following formula (4c), a fluoride fluorescent material having a composition encompassed in a compositional formula represented by the following formula (4d), a fluoride fluorescent material having a composition encompassed in a compositional formula represented by the following formula (4e), a nitride fluorescent material having a composition encompassed in a compositional formula represented by the following formula (40, and a nitride fluorescent material having a composition encompassed in a compositional formula represented by the following formula (4g), and may contain two or more kinds of fluorescent materials. In the case where the fourth fluorescent material contains two or more kinds of fluorescent materials, the two or more kinds of the fourth fluorescent materials preferably have light emission peak wavelengths in different ranges that are both in a range of 610 nm or more and less than 700 nm.

$$(Sr,Ca)AlSiN_3:Eu \tag{4a}$$

$$3.5MgO\cdot 0.5MgF_2\cdot GeO_2:Mn \tag{4b}$$

$$(Ca,Sr,Mg)_kSi_{12-(m+n)}Al_{m+n}O_nN_{16-n}:Eu \tag{4c}$$

wherein in the formula (4c), k, m, and n satisfy $0<k\leq 2.0$, $2.0\leq m\leq 6.0$, and $0\leq n\leq 2.0$, $$A_c[M^6{}_{1-b}Mn^{4+}{}_bF_d] \tag{4d}$$

wherein in the formula (4d), A contains at least one kind selected from the group consisting of $K^+$, $Li^+$, $Na^+$, $Rb^+$, $Cs^+$, and $NH_4^+$, in which $K^+$ is preferred, $M^6$ contains at least one kind of an element selected from the group consisting of Group 4 elements and Group 14 elements, in which Si and Ge are preferred, b satisfies $0<b<0.2$, c represents the absolute value of the charge of the $[M^6{}_{1-b}Mn^{4+}{}_bF_d]$ ion, and d satisfies $5<d<7$, $$A'_{c'}[M^{6'}{}_{1-b'}Mn^{4+}{}_{b'}F_{d'}] \tag{4e}$$

wherein in the formula (4e), A' contains at least one kind selected from the group consisting of $K^+$, $Li^+$, $Na^+$, $Rb^+$, $Cs^+$, and $NH_4^+$, in which $K^+$ is preferred, $M^{6'}$ contains at least one kind of an element selected from the group consisting of Group 4 elements, Group 13 elements, and Group 14 elements, in which Si and Al are preferred, b' satisfies $0<b'<0.2$, c' represents the absolute value of the charge of the $[M^{6'}{}_{1-b'}Mn^{4+}{}_{b'}F_{d'}]$ ion, and d' satisfies $5<d'<7$, $$(Ba,Sr,Ca)_2Si_5N_8:Eu \tag{4f}$$

$$(Sr,Ca)LiAl_3N_4:Eu \tag{4g}$$

The fifth fluorescent material preferably contains at least one kind of a fluorescent material selected from the group consisting of a gallate fluorescent material having a composition encompassed in a compositional formula represented by the following formula (5a), an aluminate fluorescent material having a composition encompassed in a compositional formula represented by the following formula (5b), a gallate fluorescent material having a composition encompassed in a compositional formula represented by the following formula (5c), an oxide fluorescent material having a composition encompassed in a compositional formula represented by the following formula (5d), an aluminate fluorescent material having a composition encompassed in a compositional formula represented by the following formula (5e), an oxide fluorescent material having a composition encompassed in a compositional formula represented by the following formula (50 that is different in composition from the aforementioned oxide fluorescent material, and an oxide fluorescent material having a composition encompassed in a compositional formula represented by the following formula (5g) that is different in composition from the aforementioned oxide fluorescent material, and may contain two or more kinds of fluorescent materials.

$$Ga_2O_3:Cr \tag{5a}$$

$$Al_2O_3:Cr \tag{5b}$$

$$ZnGa_2O_4:Cr \tag{5c}$$

$$(Mg_{1-t1}M^7{}_{t1})_{u1}(Ga_{1-v1-x1-y1}M^8{}_{v1})_2O_{w1}:Cr_{x1},M^9{}_{y1} \tag{5d}$$

wherein in the formula (5d), $M^7$ is at least one kind of an element selected from the group consisting of Ca, Sr, Ba, Ni, and Zn, $M^8$ is at least one kind of an element selected from the group consisting of B, Al, In, and Sc, $M^9$ is at least one kind of an element selected from the group consisting of Eu, Ce, Tb, Pr, Nd, Sm, Yb, Ho, Er, Tm, and Mn, t1, u1, v1, w1, x1, and y1 satisfy $0\leq t1\leq 0.8$, $0.7\leq u1\leq 1.3$, $0\leq v1\leq 0.8$, $3.7\leq w1\leq 4.3$, $0.02\leq x1\leq 0.3$, $0\leq y1\leq 0.2$, and $y1<x1$ $$(Lu,Y,Gd,Tb)_3(Al,Ga)_5O_{12}:Ce,Cr \tag{5e}$$

$$M^{10}{}_gM^{11}{}_hM^{12}{}_iM^{13}{}_5O_j:Cr_e,M^{14}{}_f \tag{5f}$$

wherein in the formula (5f), $M^{10}$ is at least one kind of an element selected from the group consisting of Li, Na, K, Rb, and Cs, $M^{11}$ is at least one kind of an element selected from the group consisting of Mg, Ca, Sr, Ba, and Zn, $M^{12}$ is at least one kind of an element selected from the group consisting of Ba, Al, Ga, In, and rare earth elements, $M^{13}$ is at least one kind of an element selected from the group consisting of Si, Ti, Ge, Zr, Sn, Hf, and Pb, $M^{14}$ is at least one kind of an element selected from the group consisting of Eu, Ce, Tb, Pr, Nd, Sm, Yb, Ho, Er, Tm, Ni, and Mn, and e, f, g, h, i, and j satisfy $0<e\leq0.2$, $0\leq f\leq0.1$, $f<e$, $0.7\leq g\leq1.3$, $1.5\leq h\leq2.5$, $0.7\leq i\leq1.3$, and $12.9\leq j\leq15.1$,

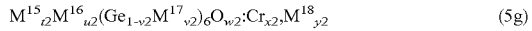

$$M^{15}{}_{t2}M^{16}{}_{u2}(Ge_{1-v2}M^{17}{}_{v2})_6O_{w2}:Cr_{x2},M^{18}{}_{y2} \qquad (5g)$$

wherein in the formula (5g), $M^{15}$ is at least one kind of an element selected from the group consisting of Li, Na, K, Rb, and Cs, $M^{16}$ is at least one kind of an element selected from the group consisting of Ca, Sr, Mg, Ba, and Zn, $M^{17}$ is at least one kind of an element selected from the group consisting of Si, Ti, Zr, Sn, Hf, and Pb, $M^{18}$ is at least one kind of an element selected from the group consisting of Eu, Ce, Tb, Pr, Nd, Sm, Yb, Ho, Er, Tm, Ni, and Mn, and t2, u2, v2, w2, x2, and y2 satisfy $1.5\leq t2\leq2.5$, $0.7\leq u2\leq1.3$, $0\leq v2\leq0.4$, $12.9\leq w2\leq15.1$, $0\leq x2\leq0.2$, $0\leq y2\leq0.10$, $y2<x2$.

Figure 2:
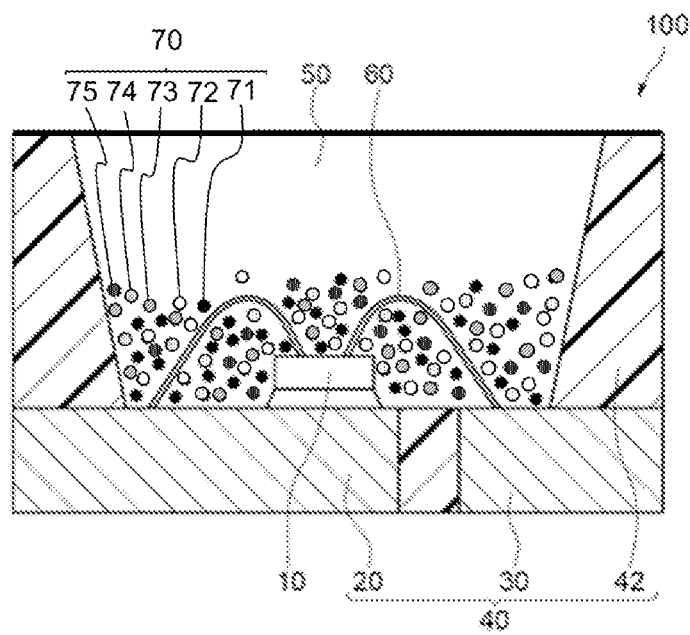
FIG. 2 is a schematic cross sectional view showing another example of the first constitutional example of the light emitting device.

Examples of the light emitting device will be described with reference to the drawing. FIG. 1 is a schematic cross sectional view showing an example of the first constitutional example of the light emitting device. FIG. 2 is a schematic cross sectional view showing another example of the first constitutional example of the light emitting device.

As shown in FIG. 1, a light emitting device 100 includes a molded article 40 having a recessed portion, a light emitting element 10 functioning as an excitation light source, and a wavelength conversion member 50 covering the light emitting element 10. The molded article 40 includes a first lead 20, a second lead 30, and a resin part 42 containing a thermoplastic resin or a thermosetting resin, which are integrally molded. The molded article 40 has disposed therein the first lead 20 and the second lead 30 constituting the bottom surface of the recessed portion, and has disposed therein the resin part 42 constituting the side surface of the recessed portion. The light emitting element 10 is mounted on the bottom surface of the recessed portion of the molded article 40. The light emitting element 10 has one pair of positive and negative electrodes, and the one pair of positive and negative electrodes are electrically connected to the first lead 20 and the second lead 30 via wires 60, respectively. The light emitting element 10 is covered with the wavelength conversion member 50. The wavelength conversion member 50 contains a fluorescent material 70 performing wavelength conversion of the light emitting element 10, and a translucent material. The fluorescent material 70 necessarily contains a first fluorescent material 71 containing the oxide fluorescent material. The fluorescent material 70 may contain a fluorescent material having a light emission peak wavelength in a different wavelength range from the light emission peak wavelength of the first fluorescent material 71. As shown in FIG. 2, the fluorescent material 70 preferably contains at least one kind of a fluorescent material selected from the group consisting of a second fluorescent material 72, a third fluorescent material 73, a fourth fluorescent material 74, and a fifth fluorescent material 75 described above, and may contain two or more kinds thereof. The fluorescent material 70 necessarily contains the first fluorescent material 71, and may contain the second fluorescent material 72, the third fluorescent material 73, the fourth fluorescent material 74, and the fifth fluorescent material 75. The wavelength conversion member 50 also functions as a member for protecting the light emitting element 10 and the fluorescent material 70 from the external environment. The light emitting device 100 emits light by supplying electric power from the outside via the first lead 20 and the second lead 30.

Figure 3A:
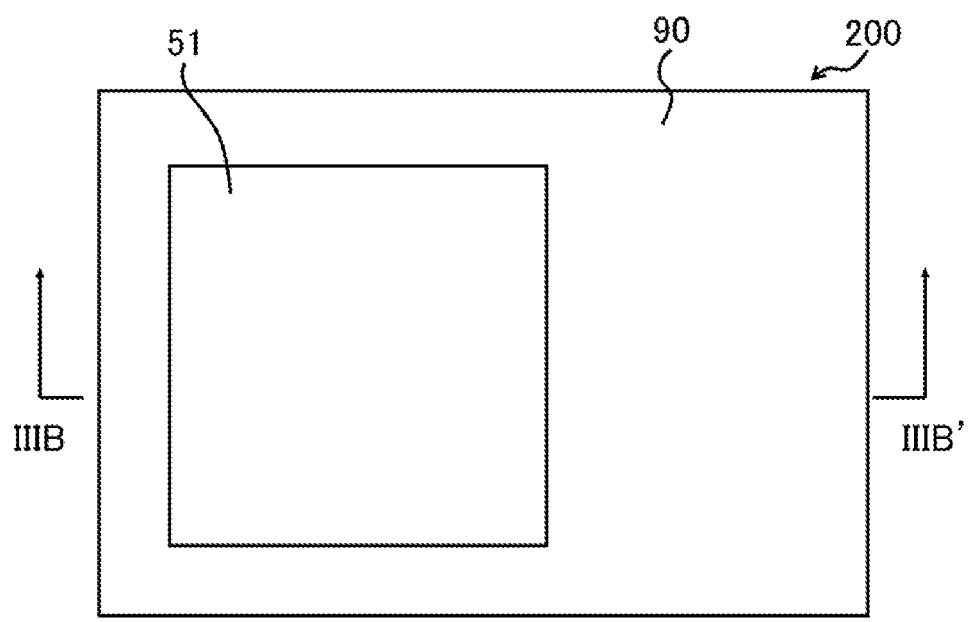
FIG. 3A is a schematic plan view showing the second constitutional example of the light emitting device.
Figure 3B:
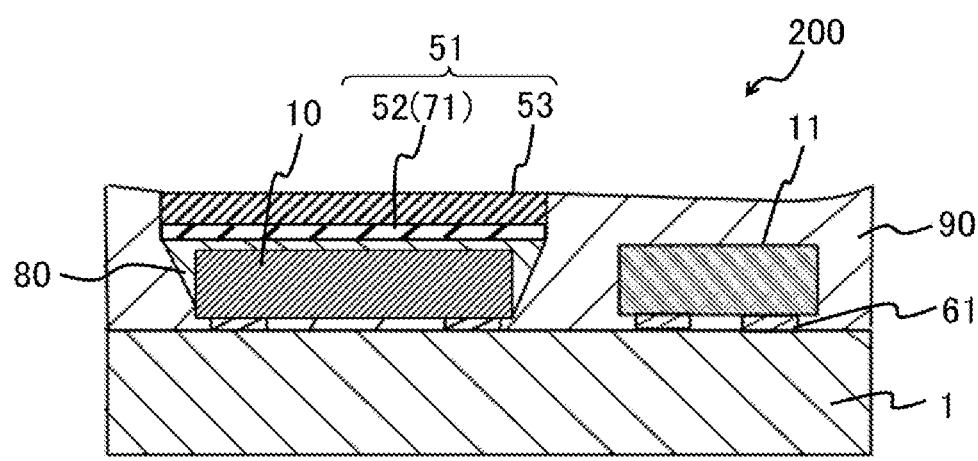
FIG. 3B is a schematic cross sectional view showing the second constitutional example of the light emitting device.
Figure 4:
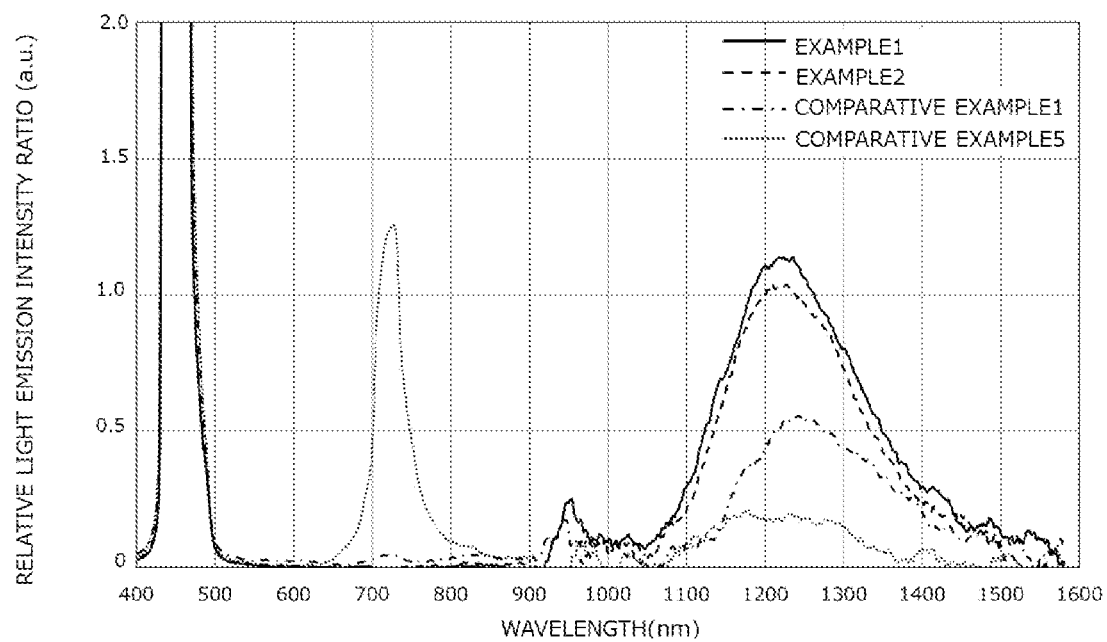
FIG. 4 is a diagram showing the light emission spectra of the oxide fluorescent materials according to Examples 1 and 2 and the light emission spectra of the oxide fluorescent materials according to Comparative Examples 1 and 5.
Figure 5:
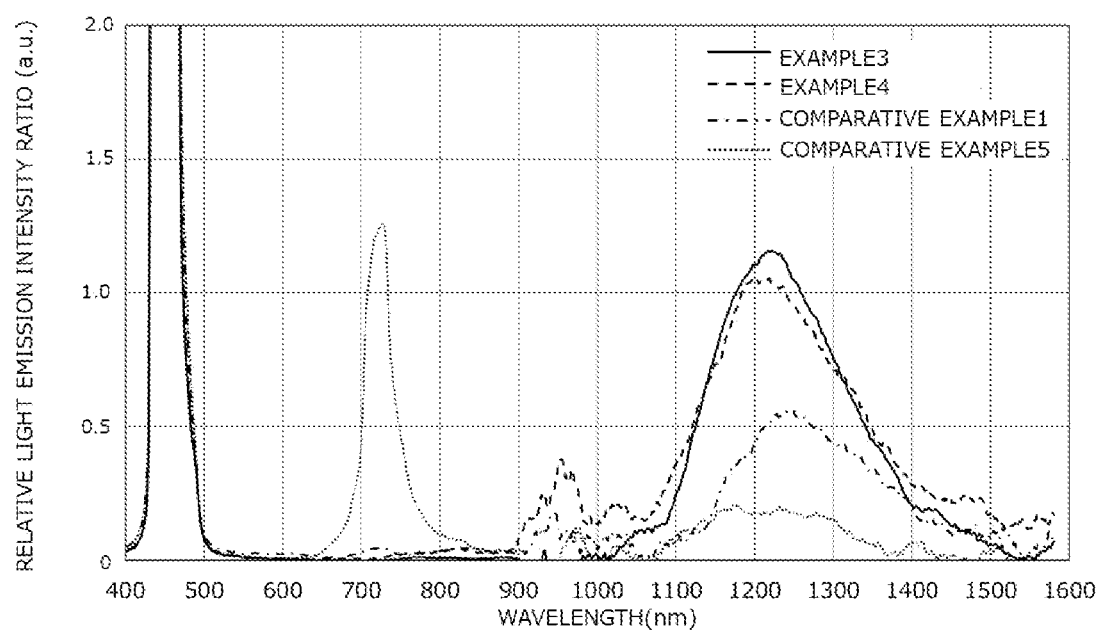
FIG. 5 is a diagram showing the light emission spectra of the oxide fluorescent materials according to Examples 3 and 4 and the light emission spectra of the oxide fluorescent materials according to Comparative Examples 1 and 5.
Figure 6:
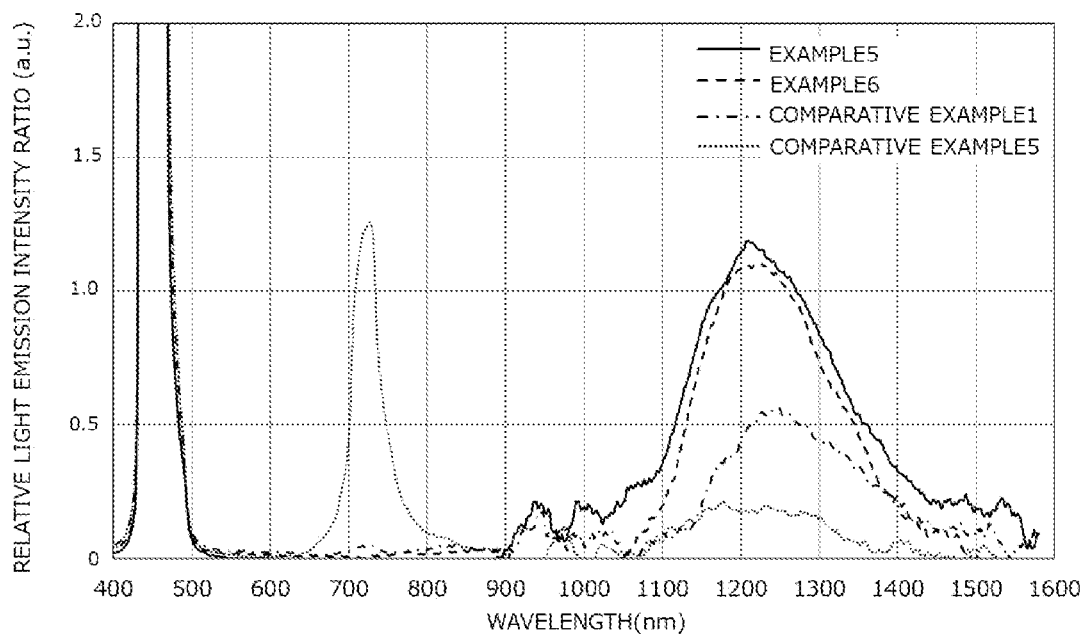
FIG. 6 is a diagram showing the light emission spectra of the oxide fluorescent materials according to Examples 5 and 6 and the light emission spectra of the oxide fluorescent materials according to Comparative Examples 1 and 5.
Figure 7:
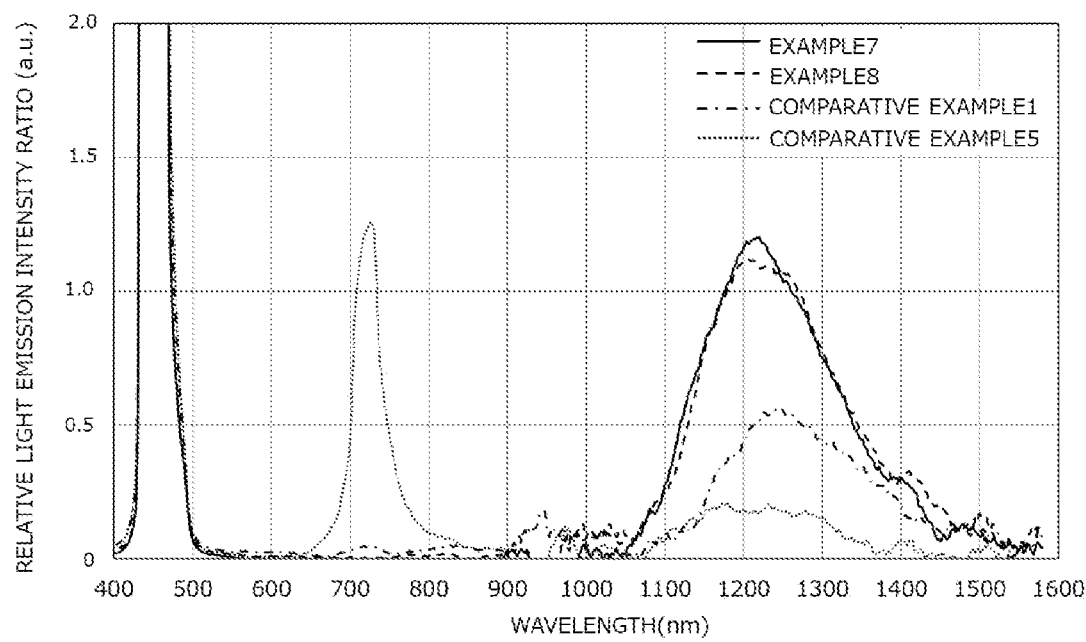
FIG. 7 is a diagram showing the light emission spectra of the oxide fluorescent materials according to Examples 7 and 8 and the light emission spectra of the oxide fluorescent materials according to Comparative Examples 1 and 5.
Figure 8:
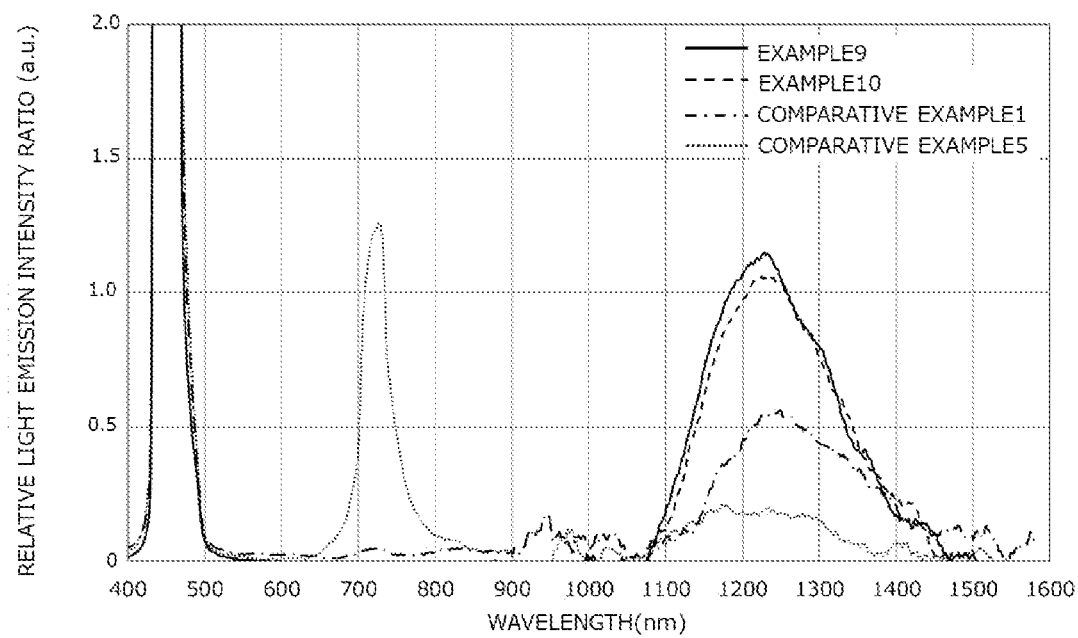
FIG. 8 is a diagram showing the light emission spectra of the oxide fluorescent materials according to Examples 9 and 10 and the light emission spectra of the oxide fluorescent materials according to Comparative Examples 1 and 5.
Figure 9:
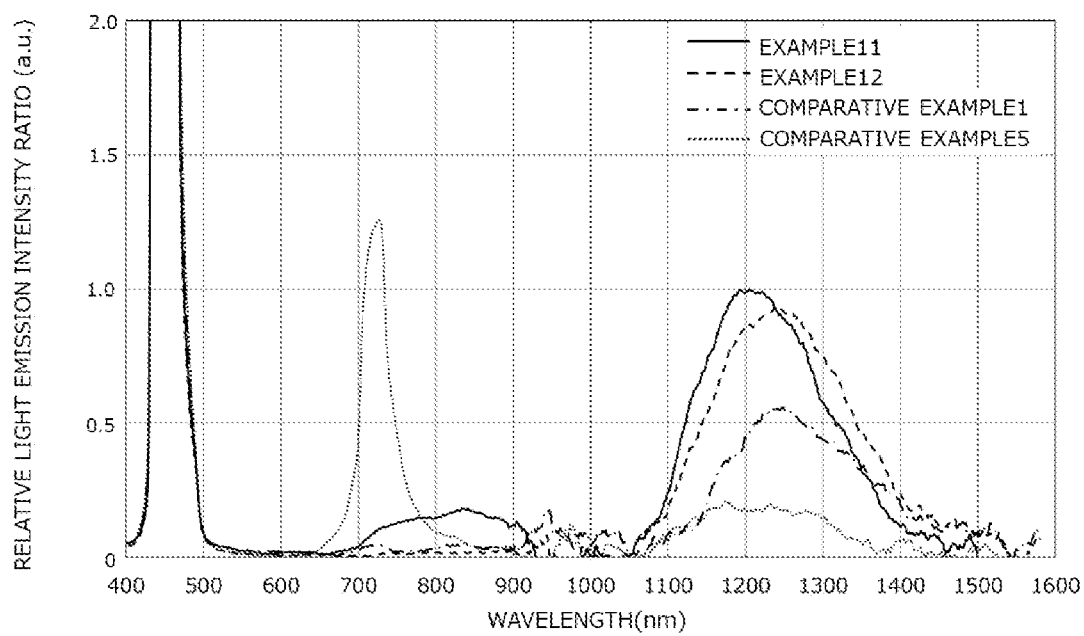
FIG. 9 is a diagram showing the light emission spectra of the oxide fluorescent materials according to Examples 11 and 12 and the light emission spectra of the oxide fluorescent materials according to Comparative Examples 1 and 5.

FIGS. 3A and 3B show the second constitutional example of the light emitting device. FIG. 3A is a schematic plan view of a light emitting device 200. FIG. 3B is a schematic cross sectional view of the light emitting device 200 shown in FIG. 3A on the line IIIB-IIIB'. The light emitting device 200 includes a light emitting element 10 having a light emission peak wavelength in a range of 365 nm or more and 500 nm or less, and a wavelength conversion member 51 including a wavelength conversion body 52 containing a first fluorescent material 71 emitting light through excitation with light from the light emitting element 10, and a translucent article 53 having disposed thereon the wavelength conversion body 52. The light emitting element 10 is flip-chip-mounted on a substrate 1 via bumps as a conductive member 61. The wavelength conversion body 52 of the wavelength conversion member 51 is provided on the light emission surface of the light emitting element 10 via an adhesive layer 80. The light emitting element 10 and the wavelength conversion member 51 are covered on the side surfaces thereof with a covering member 90 reflecting light. The wavelength conversion body 52 is excited with light from the light emitting element 10, and necessarily contains the first fluorescent material 71 containing the oxide fluorescent material. The wavelength conversion body 52 may contain at least one kind selected from the group consisting of the second fluorescent material, the third fluorescent material, the fourth fluorescent material, and the fifth fluorescent material. The light emitting element 10 can allow the light emitting device 200 to emit light by supplying electric power from the outside of the light emitting device 200 via wirings and the conductive member 61 formed on the substrate 1. The light emitting device 200 may include a semiconductor element 11, such as a protective element for protecting the light emitting element 10 from being broken due to application of an excessive voltage. The covering member 90 is provided, for example, to cover the semiconductor element 11. The members used in the light emitting device will be described below. For the details thereof, reference may also be made, for example, to the description of JP 2014-112635 A.

Examples of the translucent material constituting the wavelength conversion member along with the fluorescent material include at least one kind selected from the group consisting of a resin, glass, and an inorganic material. The resin used may be at least one kind of a resin selected from the group consisting of a silicone resin, an epoxy resin, a phenol resin, a polycarbonate resin, an acrylic resin, and modified resins thereof. A silicone resin and a modified silicone resin are preferred since these resins are excellent in heat resistance and light resistance. The wavelength conversion member may contain a filler, a colorant, and a light diffusing material, depending on necessity in addition to the fluorescent material and the translucent material. Examples of the filler include silicon oxide, barium titanate, titanium oxide, and aluminum oxide.

In the case where the wavelength conversion member contains the resin and the fluorescent material, it is preferred that a composition for forming a wavelength conversion member containing the fluorescent material in the resin is prepared, and the wavelength conversion member is formed by using the composition for forming a wavelength conversion member. The composition for forming a wavelength conversion member preferably has a content of the first fluorescent material containing the oxide fluorescent material in a range of 20 parts by mass or more and 100 parts by mass or less, per 100 parts by mass of the resin, and may be in a range of 25 parts by mass or more and 90 parts by mass or less, and may be in a range of 30 parts by mass or more and 85 parts by mass or less. The first fluorescent material may contain only the oxide fluorescent material. The oxide fluorescent material contained in the first fluorescent material may contain two or more kinds of the oxide fluorescent materials having different compositions from each other.

The composition for forming a wavelength conversion member may be regulated to have the contents of the fluorescent materials in the ranges described below.

The content of the second fluorescent material contained in the composition for forming a wavelength conversion member may be in a range of 10 parts by mass or more and 100 parts by mass or less, may be in a range of 20 parts by mass or more and 90 parts by mass or less, and may be in a range of 30 parts by mass or more and 80 parts by mass or less, per 100 parts by mass of the resin.

The content of the third fluorescent material contained in the composition for forming a wavelength conversion member may be in a range of 5 parts by mass or more and 100 parts by mass or less, may be in a range of 10 parts by mass or more and 90 parts by mass or less, may be in a range of 15 parts by mass or more and 80 parts by mass or less, may be in a range of 20 parts by mass or more and 70 parts by mass of less, and may be in a range of 25 parts by mass or more and 60 parts by mass of less, per 100 parts by mass of the resin.

The content of the fourth fluorescent material contained in the composition for forming a wavelength conversion member may be in a range of 1 part by mass or more and 50 parts by mass or less, may be in a range of 2 parts by mass or more and 40 parts by mass or less, may be in a range of 3 parts by mass or more and 30 parts by mass or less, may be in a range of 4 parts by mass or more and 40 parts by mass of less, and may be in a range of 5 parts by mass or more and 20 parts by mass or less, per 100 parts by mass of the resin.

The content of the fifth fluorescent material contained in the composition for forming a wavelength conversion member may be in a range of 5 parts by mass or more and 100 parts by mass or less, may be in a range of 10 parts by mass or more and 90 parts by mass or less, may be in a range of 20 parts by mass or more and 80 parts by mass or less, and may be in a range of 30 parts by mass or more and 70 parts by mass of less, per 100 parts by mass of the resin. In the case where the composition for forming a wavelength conversion member contains the fifth fluorescent material, and the fifth fluorescent material contains two or more kinds of fluorescent materials, the content of the fifth fluorescent material means the total content of the two or more kinds of the fifth fluorescent materials. In the case where the composition for forming a wavelength conversion member contains two or more kinds of any of the second to fifth fluorescent materials, the content thereof means the total content of the two or more kinds of the fluorescent materials.

The total content of the fluorescent materials contained in the composition for forming a wavelength conversion member may be in a range of 50 parts by mass or more and 300 parts by mass or less, may be in a range of 100 parts by mass or more and 280 parts by mass or less, may be in a range of 120 parts by mass or more and 260 parts by mass or less, and may be in a range of 150 parts by mass or more and 250 parts by mass or less, per 100 parts by mass of the resin.

The wavelength conversion member may have a translucent article. The translucent article used may be a plate article formed of a translucent material, such as glass or a resin. Examples of the glass include borosilicate glass and quartz glass. Examples of the resin include a silicone resin and an epoxy resin. In the case where the wavelength conversion member has a substrate, it is preferred that the substrate is an insulating material and is a material that is difficult to transmit the light from the light emitting element and the external light. Examples of the material constituting the substrate include ceramics such as aluminum oxide and aluminum nitride, and a resin, such as a phenol resin, an epoxy resin, a polyimide resin, a bismaleimide-triazine resin (BT resin), and a polyphthalamide (PPA) resin. In the case where an adhesive layer intervenes between the light emitting element and the wavelength conversion member, the adhesive constituting the adhesive layer is preferably formed of a material capable of optically connecting the light emitting element and the wavelength conversion member. The material constituting the adhesive layer is preferably at least one kind of a resin selected from the group consisting of an epoxy resin, a silicone resin, a phenol resin, and a polyimide resin.

Examples of the semiconductor element provided in the light emitting device depending on necessity include a transistor for controlling the light emitting element, and a protective element for suppressing breakage and performance deterioration of the light emitting element due to application of an excessive voltage. Examples of the protective element include a Zener diode. In the case where the light emitting device has a covering member, the material of the covering member used is preferably an insulating material. Specific examples thereof include a phenol resin, an epoxy resin, a bismaleimide-triazine resin (BT resin), a polyphthalamide (PPA) resin, and a silicone resin. The covering member may contain a colorant, a fluorescent material, and a filler, depending on necessity. The light emitting device may use a bump as the conductive member. Examples of the material of the bump include Au or an alloy thereof, and other conductive members, such as eutectic solder (Au—Sn), Pb—Sn, and lead-free solder.

Production Method of Light Emitting Device

One example of the production method of the light emitting device of the first constitutional example will be described. For the details thereof, reference may also be made, for example, to the description of Japanese Unexamined Patent Publication No. 2010-062272. The production method of the light emitting device preferably includes a preparing step of a molded article, a disposing step of a light emitting element, a disposing step of a composition for forming a wavelength conversion member, and a resin package forming step. In the case where a collective molded article having plural recessed portions is used as the molded article, the production method may include a dividing step of separating resin packages of unit regions, after the resin package forming step.

In the preparing step of a molded article, plural leads are integrally molded with a thermosetting resin or a thermoplastic resin, so as to prepare a molded article having a recessed portion having a side surface and a bottom surface. The molded article may be a molded article formed of a collective substrate having plural recessed portions.

In the disposing step of a light emitting element, a light emitting element is disposed on the bottom surface of the recessed portion of the molded article, and the positive and negative electrodes of the light emitting element are connected to the first and second leads via wires.

In the disposing step of a composition for forming a wavelength conversion member, a composition for forming a wavelength conversion member is disposed in the recessed portion of the molded article.

In the resin package forming step, the composition for forming a wavelength conversion member disposed in the recessed portion of the molded article is cured to form a resin package, and thus a light emitting device is produced. In the case where a molded article including a collective substrate having plural recessed portions is used, in the dividing step after the resin package forming step, the collective substrate having the plural recessed portions is divided into resin packages of unit regions, and thus individual light emitting devices are produced. The light emitting device shown in FIGS. 1 and 2 can be produced in the aforementioned manner.

One example of the production method of the light emitting device of the second constitutional example will be described. For the details thereof, reference may also be made, for example, to the description of Japanese Unexamined Patent Publication No. 2014-112635 or Japanese Unexamined Patent Publication No. 2017-117912. The production method of the light emitting device preferably includes a disposing step of a light emitting element, a disposing step of a semiconductor element depending on necessity a forming step of a wavelength conversion member containing a wavelength conversion body, an adhering step of the light emitting element and the wavelength conversion member, and a forming step of a covering member.

For example, in the disposing step of a light emitting element, a light emitting element is disposed on a substrate. The light emitting element and the semiconductor element each are, for example, flip-chip-mounted on the substrate. Subsequently in the forming step of a wavelength conversion member containing a wavelength conversion body the wavelength conversion member may be obtained by forming a wavelength conversion body in the form of a plate, a sheet, or a layer on one surface of a translucent material by a printing method, an adhesion method, a compression molding method, or an electrodeposition method. For example, in the printing method, a composition for forming a wavelength conversion member containing a fluorescent material and a resin functioning as a binder or a solvent is printed on one surface of the translucent material, so as to form the wavelength conversion member containing the wavelength conversion body. Subsequently in the adhering step of the light emitting element and the wavelength conversion member, the wavelength conversion member is allowed to face the light emitting surface of the light emitting element, and the wavelength conversion member is bonded onto the light emitting element through an adhesive layer. Subsequently in the forming step of a covering member, the side surfaces of the light emitting element and the wavelength conversion member are covered with a composition for forming a covering member. The covering member is to reflect the light emitted from the light emitting element, and in the case where the light emitting device includes the semiconductor element, is preferably formed to embed the semiconductor element in the covering member. The light emitting device shown in FIGS. 3A and 3B can be produced in the aforementioned manner.

Method for Producing Oxide Fluorescent Material

The method for producing the oxide fluorescent material preferably includes: preparing a first compound containing Li, a second compound containing Ga, a third compound containing Cr, depending on necessity a fourth compound containing Ni, depending on necessity a fifth compound containing at least one kind of a first element $M^1$ selected from the group consisting of Na, K, Rb, and Cs, depending on necessity a sixth compound containing at least one kind of a second element $M^2$ selected from the group consisting of B, Al, Sc, In, and rare earth elements, and depending on necessity a seventh compound containing at least one kind of a third element $M^3$ selected from the group consisting of Si, Ge, Sn, Ti, Zr, Hf, Bi, V, Nb, and Ta; regulating and mixing the first compound, the second compound, the third compound, depending on necessity the fourth compound, and depending on necessity the fifth compound, the sixth compound, and the seventh compound, in such a manner that assuming that the molar ratio of Ga or in the case where the second element $M^2$ is contained, the total molar ratio of the second element $M^2$ and Ga is 5 in one mol of the composition of the oxide fluorescent material, the molar ratio of Li and the first element $M^1$ is in a range of 0.7 or more and 1.6 or less, the molar ratio of Cr is in a range of 0.05 or more and 1.2 or less, the molar ratio of Ni is in a range of 0 or more and 0.5 or less, the total molar ratio of Cr and Ni is in a range of more than 0.25 and 1.2 or less, and in the case where Ni is contained, the molar ratio of Cr is larger than the molar ratio of Ni, so as to prepare a raw material mixture; and heat-treating the raw material mixture in an atmosphere containing oxygen at a temperature in a range of 1,000° C. or more and 1,700° C. or less thereby obtaining the oxide fluorescent material, in which at least one kind selected from the group consisting of the first compound, the second compound, and the third compound used is an oxide. The raw material mixture may be prepared in such a manner that the total molar ratio of Cr and Ni is in a range of 0.26 or more and 1.2 or less.

Preparing Step of Raw Material Mixture

Raw Materials

The raw materials described above are prepared for producing the oxide fluorescent material. Examples of the first compound and the like each include an oxide, a carbonate, a chloride, and hydrates thereof, and an oxide is preferred. The first compound and the like each are preferably in the form of powder.

Specific examples of the first compound include $Li_2O$, $Li_2CO_3$, and $LiCl$, specific examples of the second compound include $Ga_2O_3$, $GaCl_2$, $GaCl_3$, and $GaBr_3$, specific examples of the third compound include $Cr_2O_3$, $Cr_2(CO_3)_3$, and $CrCl_3$, and specific examples of the fourth compound include $NiO$, $Ni_4CO_3(OH)_6(H_2O)_4$, and $NiCl_2$.

Examples of the fifth compound containing the first element $M^1$, the sixth compound containing the second element $M^2$, and the seventh compound containing the third element $M^3$ include an oxide, a carbonate, a chloride, and hydrates thereof.

Raw Material Mixture

The raw material mixture may be obtained by weighing the compounds to be the raw materials, i.e., the first compound, the second compound, the third compound, depending on necessity the fourth compound, and depending on necessity the fifth compound, the sixth compound, and the seventh compound, in such a manner that assuming that the molar ratio of Ga or the total molar ratio of the first element $M^1$ and Ga in the case where the first element $M^1$ is contained is 5 in one mol of the composition of the oxide fluorescent material to be obtained, the molar ratio of Li and the first element $M^1$ is in a range of 0.7 or more and 1.6 or less, the molar ratio of Cr is in a range of 0.05 or more and 1.2 or less, the molar ratio of Ni is in a range of 0 or more and 0.5 or less, the total molar ratio of Cr and Ni is in a range of more than 0.25 and 1.2 or less, and in the case where Ni is contained, the molar ratio of Cr is larger than the molar ratio of Ni, and mixing the compounds. The first compound, the second compound, and the third compound, and the fourth compound, the fifth compound, the sixth compound, and the seventh compound, contained depending on necessity may be mixed in a wet method or a dry method to provide the raw material mixture. The weighed compounds may be mixed with a mixer. The mixer used may be a ball mill ordinarily used industrially and may also be a vibration mill, a roll mill, a jet mill.

The raw material mixture is preferably prepared by weighing the compounds to be the raw materials in such a manner that Li, Ga, and Cr contained in the compounds, Ni contained in the compound depending on necessity, and the first element $M^1$, the second element $M^2$, and the third element $M^3$ contained in the compounds depending on necessity make a composition encompassed in a compositional formula represented by the formula (1), and mixing the compounds.

Flux

The raw material mixture may contain a flux. The flux contained in the raw material mixture accelerates the reaction among the raw materials to perform the solid state reaction more uniformly and thereby a fluorescent material having a large particle diameter that is further excellent in light emission characteristics can be obtained. In the case where the temperature of the heat treatment for providing the fluorescent material is close to the temperature at which the liquid phase of the compound used as the flux is formed, the flux accelerates the reaction among the raw materials. The flux used may be a halide containing at least one kind of an element selected from the group consisting of rare earth elements, alkaline earth metal elements, and alkali metal elements. The flux used may be a fluoride in the halide. In the case where the element contained in the flux is the same element as at least a part of the elements constituting the oxide fluorescent material, the flux may be added as a part of the raw materials of the oxide fluorescent material having the target composition to make the oxide fluorescent material having the target composition, and the flux may be added after mixing the raw materials to make the target composition.

Step of Providing Oxide Fluorescent Material Through Heat Treatment

The raw material mixture may be placed in a crucible or a boat formed of such a material as carbon, e.g., graphite, boron nitride (BN), alumina ($Al_2O_3$), tungsten (W), or molybdenum (Mo), and heat-treated in a furnace.

Heat Treatment Atmosphere

The heat treatment is preferably performed in an atmosphere containing oxygen. The content of oxygen in the atmosphere is not particularly limited. The content of oxygen in the atmosphere containing oxygen is preferably 5% by volume or more, more preferably 10% by volume or more, and further preferably 15% by volume or more. The heat treatment is preferably performed in the air atmosphere (oxygen content: 20% by volume or more). In the case where the atmosphere containing no oxygen, e.g., a content of oxygen of less than 1% by volume, the oxide fluorescent material having an intended composition may not be obtained in some cases.

Heat Treatment Temperature

The heat treatment temperature may be, for example, in a range of 1,000° C. or more and 1,700° C. or less, and is preferably 1,100° C. or more and 1,600° C. or less, and more preferably in a range of 1,300° C. or more and 1,550° C. or less. In the case where the heat treatment temperature is 1,000° C. or more and 1,700° C. or less, the decomposition under heat can be suppressed to provide a fluorescent material having a target composition and a stable crystal structure.

In the heat treatment, a retention time at a prescribed temperature may be provided. The retention time may be, for example, 0.5 hour or more and 48 hours or less, may be 1 hour or more and 40 hours or less, and may be 2 hours or more and 30 hours or less. In the case where the retention time of 0.5 hour or more and 48 hours or less is provided, the crystal growth can be accelerated.

The pressure of the heat treatment atmosphere may be the standard pressure (0.101 MPa), and may be 0.101 MPa or more, and the heat treatment may be performed in a pressurized atmosphere of 0.11 MPa or more and 200 MPa or less. The heat-treated product obtained through the heat treatment may have a crystal structure that is easily decomposed in the case where the heat treatment temperature is a high temperature, but the crystal structure can be suppressed from being decomposed by using a pressurized atmosphere.

The heat treatment time may be appropriately selected depending on the heat treatment temperature and the pressure of the atmosphere in the heat treatment, and is preferably 0.5 hour or more and 20 hours or less. In the case where the heat treatment is performed by two or more stages, the heat treatment time of one stage of the heat treatment is preferably 0.5 hour or more and 20 hours or less. In the case where the heat treatment time is 0.5 hour or more and 20 hours or less, the resulting heat-treated product can be suppressed from being decomposed, so as to provide the oxide fluorescent material that has a stable crystal structure, and can emit light having a light emission spectrum having a wide full width at half maximum in the wavelength range of near infrared light, through irradiation with the excitation light. The production cost can also be reduced thereby and the production time can be relatively reduced. The heat treatment time is more preferably 1 hour or more and 10 hours or less, and further preferably 1.5 hours or more and 9 hours or less.

The resulting heat-treated product obtained through the heat treatment may be subjected to a post-treatment, such as pulverization, dispersion, solid-liquid separation, and drying. The solid-liquid separation may be performed by a method that is ordinarily used industrially such as filtration, suction filtration, pressure filtration, centrifugation and decantation. The drying may be performed by a method that is ordinarily used industrially such as a vacuum dryer, a hot air heating dryer, a conical dryer, and a rotary evaporator.

EXAMPLES

The present invention will be specifically described with reference to examples below. The present invention is not limited to the examples.

Oxide Fluorescent Material

Example 1

Raw materials weighed to make 2.67 g of $Li_2CO_3$, 33.9 g of $Ga_2O_3$, 1.37 g of $Cr_2O_3$, and 0.27 g of NiO were used. The raw materials were weighed to make molar ratios of the elements in the charged composition of $LiGa_5O_8$:$Cr_{0.25}$, $Ni_{0.05}$. In the charged composition, the molar ratio of the element shown without molar ratio is 1. The raw materials were mixed with an agate mortar and an agate pestle for 10 minutes to provide a raw material mixture. The resulting raw material mixture was placed on an aluminum crucible and heat-treated in the air atmosphere (oxygen content: 20% by volume) at 1,450° C. and the standard pressure (0.101 MPa) for 8 hours. After the heat treatment, the resulting heat-treated product was pulverized to provide an oxide fluorescent material of Example 1.

Example 2

Raw materials weighed to make 2.67 g of $Li_2CO_3$, 33.9 g of $Ga_2O_3$, 1.37 g of $Cr_2O_3$, and 0.22 g of NiO were used. An oxide fluorescent material of Example 2 was obtained in the same manner as in Example 1 except that the raw materials were weighed to make molar ratios of the elements in the charged composition of $LiGa_5O_8$:$Cr_{0.25}$, $Ni_{0.04}$.

Example 3

Raw materials weighed to make 2.67 g of $Li_2CO_3$, 33.9 g of $Ga_2O_3$, 1.37 g of $Cr_2O_3$, and 0.16 g of NiO were used. An oxide fluorescent material of Example 3 was obtained in the same manner as in Example 1 except that the raw materials were weighed to make molar ratios of the elements in the charged composition of $LiGa_5O_8$:$Cr_{0.25}$, $Ni_{0.03}$.

Example 4

Raw materials weighed to make 2.67 g of $Li_2CO_3$, 33.9 g of $Ga_2O_3$, 1.37 g of $Cr_2O_3$, and 0.05 g of NiO were used. An oxide fluorescent material of Example 4 was obtained in the same manner as in Example 1 except that the raw materials were weighed to make molar ratios of the elements in the charged composition of $LiGa_5O_8$:$Cr_{0.25}$, $Ni_{0.01}$.

Example 5

Raw materials weighed to make 2.67 g of $Li_2CO_3$, 33.9 g of $Ga_2O_3$, 1.48 g of $Cr_2O_3$, and 0.16 g of NiO were used. An oxide fluorescent material of Example 5 was obtained in the same manner as in Example 1 except that the raw materials were weighed to make molar ratios of the elements in the charged composition of $LiGa_5O_8$:$Cr_{0.27}$, $Ni_{0.03}$.

Example 6

Raw materials weighed to make 2.67 g of $Li_2CO_3$, 33.9 g of $Ga_2O_3$, 1.48 g of $Cr_2O_3$, and 0.22 g of NiO were used. An oxide fluorescent material of Example 6 was obtained in the same manner as in Example 1 except that the raw materials were weighed to make molar ratios of the elements in the charged composition of $LiGa_5O_8$:$Cr_{0.27}$, $Ni_{0.04}$.

Example 7

Raw materials weighed to make 2.67 g of $Li_2CO_3$, 33.9 g of $Ga_2O_3$, 1.65 g of $Cr_2O_3$, and 0.16 g of NiO were used. An oxide fluorescent material of Example 7 was obtained in the same manner as in Example 1 except that the raw materials were weighed to make molar ratios of the elements in the charged composition of $LiGa_5O_8$:$Cr_{0.30}$, $Ni_{0.03}$.

Example 8

Raw materials weighed to make 2.67 g of $Li_2CO_3$, 33.9 g of $Ga_2O_3$, 1.65 g of $Cr_2O_3$, and 0.22 g of NiO were used. An oxide fluorescent material of Example 8 was obtained in the same manner as in Example 1 except that the raw materials were weighed to make molar ratios of the elements in the charged composition of $LiGa_5O_8$:$Cr_{0.30}$,$Ni_{0.04}$.

Example 9

Raw materials weighed to make 2.67 g of $Li_2CO_3$, 33.9 g of $Ga_2O_3$, 1.92 g of $Cr_2O_3$, and 0.22 g of NiO were used. An oxide fluorescent material of Example 9 was obtained in the same manner as in Example 1 except that the raw materials were weighed to make molar ratios of the elements in the charged composition of $LiGa_5O_8$:$Cr_{0.35}$, $Ni_{0.04}$.

Example 10

Raw materials weighed to make 2.67 g of $Li_2CO_3$, 33.9 g of $Ga_2O_3$, 1.92 g of $Cr_2O_3$, and 0.27 g of NiO were used. An oxide fluorescent material of Example 10 was obtained in the same manner as in Example 1 except that the raw materials were weighed to make molar ratios of the elements in the charged composition of $LiGa_5O_8$:$Cr_{0.35}$, $Ni_{0.05}$.

Example 11

Raw materials weighed to make 2.67 g of $Li_2CO_3$, 33.9 g of $Ga_2O_3$, 1.92 g of $Cr_2O_3$, and 0.16 g of NiO were used. An oxide fluorescent material of Example 11 was obtained in the same manner as in Example 1 except that the raw materials were weighed to make molar ratios of the elements in the charged composition of $LiGa_5O_8$:$Cr_{0.35}$,$Ni_{0.03}$.

Example 12

Raw materials weighed to make 2.67 g of $Li_2CO_3$, 33.9 g of $Ga_2O_3$, 1.10 g of $Cr_2O_3$, and 0.38 g of NiO were used. An oxide fluorescent material of Example 12 was obtained in the same manner as in Example 1 except that the raw materials were weighed to make molar ratios of the elements in the charged composition of $LiGa_5O_8$:$Cr_{0.20}$, $Ni_{0.07}$.

Example 13

Raw materials weighed to make 2.67 g of $Li_2CO_3$, 33.9 g of $Ga_2O_3$, and 1.54 g of $Cr_2O_3$ were used. An oxide fluorescent material of Example 13 was obtained in the same manner as in Example 1 except that the raw materials were weighed to make molar ratios of the elements in the charged composition of $LiGa_5O_8$:$Cr_{0.28}$.

Example 14

Raw materials weighed to make 2.67 g of $Li_2CO_3$, 28.8 g of $Ga_2O_3$, 2.77 g of $Al_2O_3$, 1.37 g of $Cr_2O_3$, and 0.27 g of NiO were used. An oxide fluorescent material of Example 14 was obtained in the same manner as in Example 1 except that the raw materials were weighed to make molar ratios of the elements in the charged composition of $LiGa_{4.25}Al_{0.75}O_8$:$Cr_{0.25}$,$Ni_{0.05}$.

Example 15

Raw materials weighed to make 2.67 g of $Li_2CO_3$, 23.7 g of $Ga_2O_3$, 5.55 g of $Al_2O_3$, 1.37 g of $Cr_2O_3$, and 0.27 g of NiO were used. An oxide fluorescent material of Example 15 was obtained in the same manner as in Example 1 except that the raw materials were weighed to make molar ratios of the elements in the charged composition of $LiGa_{3.5}Al_{1.5}O_8$:$Cr_{0.25}$,$Ni_{0.05}$.

Example 16

Raw materials weighed to make 2.67 g of $Li_2CO_3$, 28.8 g of $Ga_2O_3$, 3.75 g of $Sc_2O_3$, 1.37 g of $Cr_2O_3$, and 0.27 g of NiO were used. An oxide fluorescent material of Example 16 was obtained in the same manner as in Example 1 except that the raw materials were weighed to make molar ratios of the elements in the charged composition of $LiGa_{4.25}Sc_{0.75}O_8:Cr_{0.25},Ni_{0.05}$.

Example 17

Raw materials weighed to make 2.67 g of $Li_2CO_3$, 28.8 g of $Ga_2O_3$, 7.55 g of $In_2O_3$, 1.37 g of $Cr_2O_3$, and 0.27 g of NiO were used. An oxide fluorescent material of Example 17 was obtained in the same manner as in Example 1 except that the raw materials were weighed to make molar ratios of the elements in the charged composition of $LiGa_{4.25}In_{0.75}O_8:Cr_{0.25},Ni_{0.05}$.

Comparative Example 1

Raw materials weighed to make 2.67 g of $Li_2CO_3$, 33.9 g of $Ga_2O_3$, 0.33 g of $Cr_2O_3$, and 0.32 g of NiO were used. An oxide fluorescent material of Comparative Example 1 was obtained in the same manner as in Example 1 except that the raw materials were weighed to make molar ratios of the elements in the charged composition of $LiGa_5O_8:Cr_{0.06},Ni_{0.06}$.

Comparative Example 2

Raw materials weighed to make 2.67 g of $Li_2CO_3$, 33.9 g of $Ga_2O_3$, 0.33 g of $Cr_2O_3$, and 0.05 g of NiO were used. An oxide fluorescent material of Comparative Example 2 was obtained in the same manner as in Example 1 except that the raw materials were weighed to make molar ratios of the elements in the charged composition of $LiGa_5O_8:Cr_{0.06},Ni_{0.01}$.

Comparative Example 3

Raw materials weighed to make 2.67 g of $Li_2CO_3$, 33.9 g of $Ga_2O_3$, 0.33 g of $Cr_2O_3$, and 1.25 g of NiO were used. An oxide fluorescent material of Comparative Example 3 was obtained in the same manner as in Example 1 except that the raw materials were weighed to make molar ratios of the elements in the charged composition of $LiGa_5O_8:Cr_{0.06},Ni_{0.25}$.

Comparative Example 4

Raw materials weighed to make 2.67 g of $Li_2CO_3$, 33.9 g of $Ga_2O_3$, and 0.006 g of $Cr_2O_3$ were used. An oxide fluorescent material of Comparative Example 4 was obtained in the same manner as in Example 1 except that the raw materials were weighed to make molar ratios of the elements in the charged composition of $LiGa_5O_8:Cr_{0.001}$.

Comparative Example 5

Raw materials weighed to make 2.67 g of $Li_2CO_3$, 33.9 g of $Ga_2O_3$, 0.006 g of $Cr_2O_3$, and 0.005 g of NiO were used. An oxide fluorescent material of Comparative Example 5 was obtained in the same manner as in Example 1 except that the raw materials were weighed to make molar ratios of the elements in the charged composition of $LiGa_5O_8:Cr_{0.001},Ni_{0.001}$.

Measurement of Light Emission Spectrum and Light Emission Characteristics

The oxide fluorescent materials of Examples and Comparative Examples each were measured for the light emission spectrum with a quantum efficiency measurement system (QE-2000, available from Otsuka Electronics Co., Ltd.). The excitation light used in the quantum efficiency measurement system had a light emission peak wavelength of 450 nm. FIGS. 4 to 12 show the light emission spectra of the oxide fluorescent materials of Examples and for comparison the light emission spectra of the oxide fluorescent materials of Comparative Examples 1 and 5. FIG. 13 shows the light emission spectra of the oxide fluorescent materials of Comparative Examples. As the light emission characteristics, the light emission peak wavelength in the wavelength range exceeding the light emission peak wavelength of the excitation light, the full width at half maximum (FWHM), and the light emission spectrum area were obtained from each of the light emission spectra of the resulting fluorescent materials. In the light emission spectra of the resulting oxide fluorescent materials, the light emission intensity was expressed as a relative light emission intensity (a.u.) as a relative value with respect to the light emission intensity of the excitation light. Assuming the base line at a relative light emission intensity (a.u.) of 0, and the integrated value of the region surrounded by the base line, the light emission spectrum of 1,100 nm or more and 1,400 nm or less having the light emission peak wavelength, the straight line as the ordinate at 1,100 nm, and the straight line as the ordinate at 1,400 nm was designated as the light emission spectrum area of the oxide fluorescent material. The relative value of the light emission spectrum area of the oxide fluorescent material with respect to the light emission spectrum area of the oxide fluorescent material of Comparative Example 1 as 100% was designated as the light emission spectrum area ratio (%). A larger light emission spectrum area ratio means higher light emission energy of the oxide fluorescent material. The results are shown in Table 1.

TABLE 1

| | Charged composition | Light emission peak wavelength (nm) | Full width at half maximum (FWHM) (nm) | Light emission spectrum area ratio (%) |
|---|---|---|---|---|
| Example 1 | $LiGa_5O_8:Cr_{0.25}, Ni_{0.05}$ | 1230 | 190 | 211.3 |
| Example 2 | $LiGa_5O_8:Cr_{0.25}, Ni_{0.04}$ | 1200 | 180 | 189.5 |
| Example 3 | $LiGa_5O_8:Cr_{0.25}, Ni_{0.03}$ | 1210 | 190 | 208.2 |
| Example 4 | $LiGa_5O_8:Cr_{0.25}, Ni_{0.01}$ | 1230 | 190 | 201.9 |
| Example 5 | $LiGa_5O_8:Cr_{0.27}, Ni_{0.03}$ | 1220 | 190 | 227.2 |
| Example 6 | $LiGa_5O_8:Cr_{0.27}, Ni_{0.04}$ | 1200 | 200 | 200.9 |
| Example 7 | $LiGa_5O_8:Cr_{0.30}, Ni_{0.03}$ | 1210 | 180 | 212.5 |
| Example 8 | $LiGa_5O_8:Cr_{0.30}, Ni_{0.04}$ | 1200 | 190 | 209.4 |
| Example 9 | $LiGa_5O_8:Cr_{0.35}, Ni_{0.04}$ | 1220 | 180 | 200.4 |
| Example 10 | $LiGa_5O_8:Cr_{0.35}, Ni_{0.05}$ | 1230 | 180 | 188.9 |

TABLE 1-continued

|  | Charged composition | Light emission peak wavelength (nm) | Full width at half maximum (FWHM) (nm) | Light emission spectrum area ratio (%) |
|---|---|---|---|---|
| Example 11 | $LiGa_5O_8:Cr_{0.35}, Ni_{0.03}$ | 1220 | 200 | 177.7 |
| Example 12 | $LiGa_5O_8:Cr_{0.20}, Ni_{0.07}$ | 1260 | 220 | 177.7 |
| Example 13 | $LiGa_5O_8:Cr_{0.28}$ | 840 | 210 | 5.4 |
| Example 14 | $LiGa_{4.25}Al_{0.75}O_8:Cr_{0.25}, Ni_{0.05}$ | 1190 | 200 | 217.4 |
| Example 15 | $LiGa_{3.5}Al_{1.5}O_8:Cr_{0.25}, Ni_{0.05}$ | 1185 | 210 | 222.7 |
| Example 16 | $LiGa_{4.25}Sc_{0.75}O_8:Cr_{0.25}, Ni_{0.05}$ | 1280 | 220 | 136.2 |
| Example 17 | $LiGa_{4.25}In_{0.75}O_8:Cr_{0.25}, Ni_{0.05}$ | 1310 | 210 | 78.9 |
| Comparative Example 1 | $LiGa_5O_8:Cr_{0.06}, Ni_{0.06}$ | 1210 | 180 | 100.0 |
| Comparative Example 2 | $LiGa_5O_8:Cr_{0.06}, Ni_{0.01}$ | 719, 1230 | 160 | 116.0 |
| Comparative Example 3 | $LiGa_5O_8:Cr_{0.06}, Ni_{0.25}$ | 1290 | 230 | 66.8 |
| Comparative Example 4 | $LiGa_5O_8:Cr_{0.001}$ | 719 | 10 | 0.0 |
| Comparative Example 5 | $LiGa_5O_8:Cr_{0.001}, Ni_{0.001}$ | 719, 1230 | 160 | 36.7 |

As shown in Table 1 or FIGS. 4 to 9, the oxide fluorescent materials of Examples 1 to 12 each had a composition encompassed in the compositional formula represented by the formula (1), and provided a light emission spectrum having a light emission peak wavelength in a wavelength range of near infrared light of 1,150 nm or more and 1,300 nm or less, and having a full width at half maximum of 150 nm or more. The oxide fluorescent materials of Examples 1 to 12 each had a larger light emission spectrum area, which was represented by the integrated value of the region surrounded by the base line having a light emission intensity of 0, the straight line as the ordinate at 1,150 nm, the straight line as the ordinate at 1,400 nm, and the light emission spectrum, than the light emission spectrum area of the oxide fluorescent material of Comparative Example 1, and thus emitted light having higher light emission energy.

Figure 10:
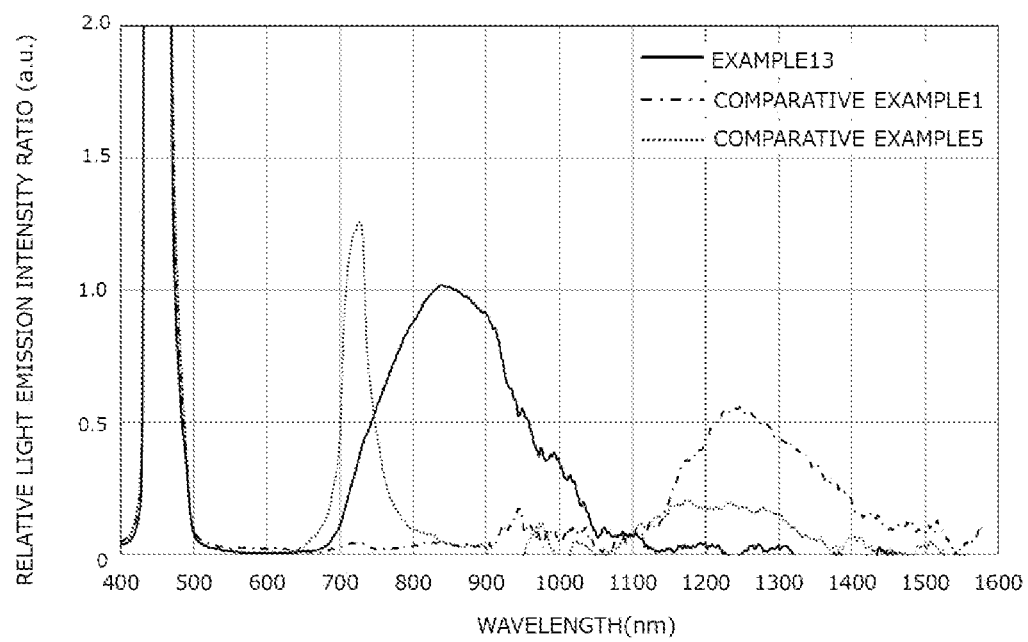
FIG. 10 is a diagram showing the light emission spectrum of the oxide fluorescent material according to Example 13 and the light emission spectra of the oxide fluorescent materials according to Comparative Examples 1 and 5.

As shown in Table 1 or FIG. 10, the oxide fluorescent material of Example 13 had a composition encompassed in the compositional formula represented by the formula (1), and a light emission spectrum having a light emission peak wavelength in a wavelength range of 700 nm or more and 900 nm or less, and a wider full width at half maximum of 150 nm or more than Comparative Example 4.

Figure 11:
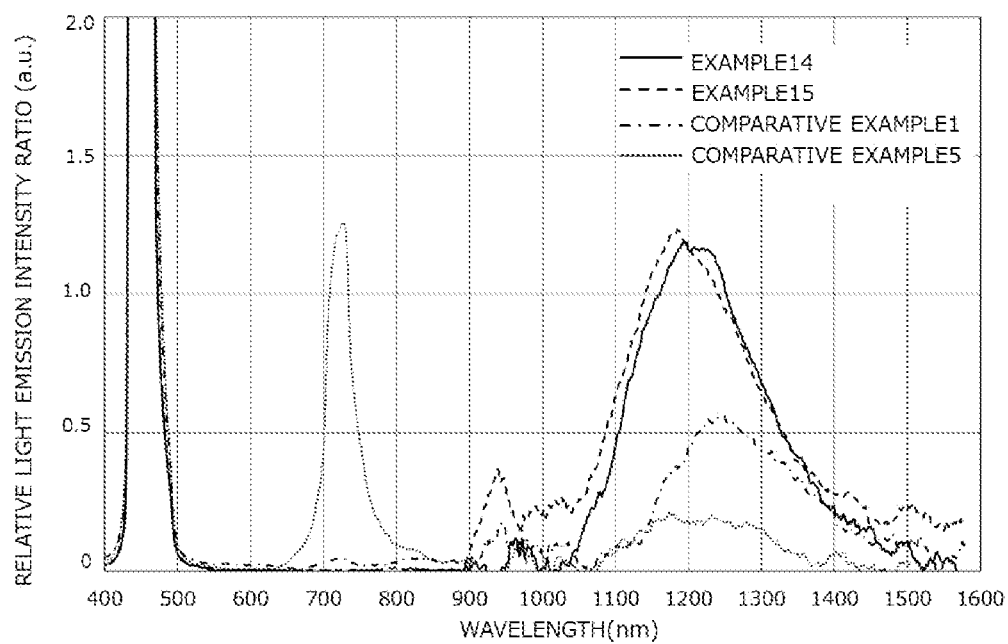
FIG. 11 is a diagram showing the light emission spectra of the oxide fluorescent materials according to Examples 14 and 15 and the light emission spectra of the oxide fluorescent materials according to Comparative Examples 1 and 5.
Figure 12:
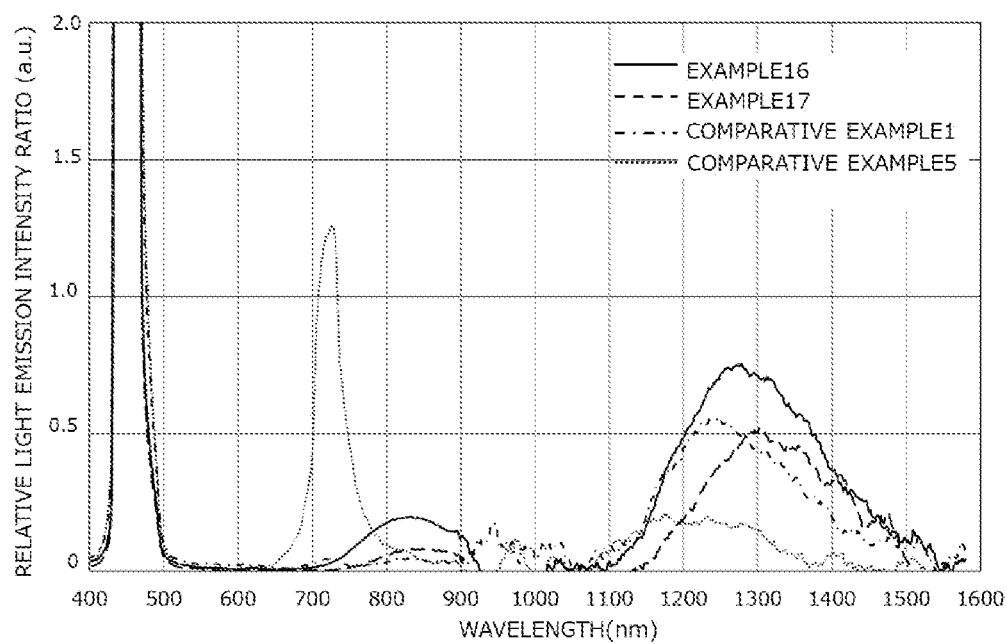
FIG. 12 is a diagram showing the light emission spectra of the oxide fluorescent materials according to Examples 16 and 17 and the light emission spectra of the oxide fluorescent materials according to Comparative Examples 1 and 5.
Figure 13:
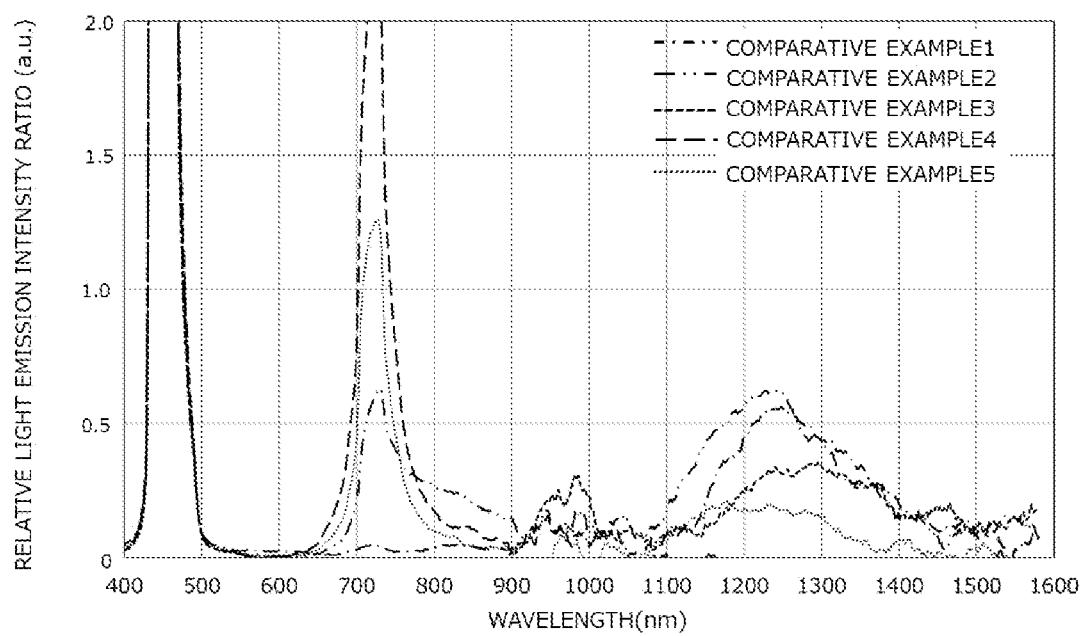
FIG. 13 is a diagram showing the light emission spectra of the oxide fluorescent materials according to Comparative Examples 1 to 5.

As shown in Table 1 or FIGS. 11 and 12, the oxide fluorescent materials of Examples 14 to 17 each had a composition encompassed in the compositional formula represented by the formula (1), and a light emission spectrum having a light emission peak wavelength in a wavelength range of 1,150 nm or more and 1,300 nm or less, and a full width at half maximum of 150 nm or more.

As shown in Table 1 or FIG. 13, the oxide fluorescent materials of Comparative Examples 1 to 3 and 5 each had a light emission peak wavelength in a wavelength range of near infrared light of 1,150 nm or more and 1,300 nm or less.

The oxide fluorescent materials of Comparative Examples 1 to 3 and 5 each did not satisfy the compositional formula represented by the formula (1), and had a total molar ratio of Cr and Ni of less than 5% by mol with respect to the total molar ratio of Ga, and therefore had a light emission spectrum area in a range of 1,150 nm or more and 1,400 nm or less that was smaller than that of the oxide fluorescent materials of Examples 1 to 12. Furthermore, the light emission spectrum area ratio of the oxide fluorescent material of Comparative Example 5 was smaller than that of Comparative Example 1 by 50% or less.

In the composition of the oxide fluorescent material of Comparative Example 3, the molar ratio of Cr is smaller than the molar ratio of Ni, resulting in smaller absorption of the excitation light by Cr, and thus the energy transfer from Cr to Ni is also small. Accordingly the light emission spectrum area in a range of 1,150 nm or more and 1,400 nm or less was smaller than that of the oxide fluorescent materials of Comparative Examples 1 and 2. The oxide fluorescent material of Comparative Example 4 having a small molar ratio of Cr of less than 0.05 and containing no Ni as the activator element had a light emission peak wavelength confirmed in a range of 700 nm to 815 nm derived from Cr as the activator element, but did not have a light emission peak wavelength confirmed in a range of 1,150 nm or more and 1,300 nm or less derived from Ni as the activator element.

Light Emitting Device According to Example

The wavelength conversion member used in the light emitting device had the charged composition shown below, and the light emission peak wavelengths of the fluorescent materials through excitation with a light emitting element having a light emission peak wavelength of 420 nm are shown in Table 2.

First Fluorescent Material

Example 1: $LiGa_5O_8:Cr_{0.25}, Ni_{0.05}$    Formula (1-1)

Second Fluorescent Material $Ca_{10}(PO_4)_6Cl_2:Eu$    Formula (2a-1)

Third Fluorescent Material $Ca_8MgSi_4O_{16}Cl_2:Eu$    Formula (3a-1)

$Lu_3Al_5O_{12}:Ce$    Formula (3b-1)

Fourth Fluorescent Material $(Sr,Ca)AlSiN_3:Eu$    Formula (4a-1)

$(Ba,Sr)_2Si_5N_8:Eu$    Formula (4f-1)

Fifth Fluorescent Material $Ga_2O_3:Cr$    Formula (5a-1)

$Na_2CaGe_6O_{14}:Cr$    Formula (5g-1)

Light Emitting Device of Example

The oxide fluorescent material of Example 1 was used as the first fluorescent material. The second fluorescent material, the third fluorescent material, the fourth fluorescent material, and the fifth fluorescent material shown in Table 2 were mixed with and dispersed in a silicone resin to make the composition shown in Table 2, and then the mixture was deaerated to provide a composition for forming a wavelength conversion member. In Table 2, in each of the examples and comparative examples, the amounts of the first fluorescent material, the second fluorescent material, the third fluorescent material, the fourth fluorescent material, and the fifth fluorescent material mixed each are shown by a part by mass per 100 parts by mass of the resin. The total amount of the fluorescent materials in the composition for forming a wavelength conversion member was 205.4 parts by mass per 100 parts by mass of the resin. Subsequently a molded article having a recessed portion shown in FIG. 2 was prepared, and a light emitting element having a gallium nitride based semiconductor having a light emission peak wavelength of 420 nm was disposed on the first lead on the bottom surface of the recessed portion. The composition for forming a wavelength conversion member was injected on the light emitting element to fill the recessed portion therewith, and the resin in the composition for forming a wavelength conversion member was cured by heating. The light emitting element had a full width at half maximum of the light emission spectrum of 15 nm. A light emitting device according to Example was produced in this manner.

Measurement of Light Emission Spectrum

The light emitting device according to Example was measured for the light emission spectrum at room temperature (25° C.±5° C.) with an optical measurement system including a combination of a spectral photometer and an integral sphere.

TABLE 2

|  |  | Light emission peak wavelength (nm) | Composition (part by mass) |
|---|---|---|---|
| Silicone resin amount |  | — | 100.0 |
| (1-1) | $LiGa_5O_8:Cr_{0.25}, Ni_{0.05}$ | 1230 | 40.0 |
| (2a-1) | $Ca_{10}(PO_4)_6Cl_2:Eu$ | 450 | 60.0 |
| (3a-1) | $Ca_8MgSi_4O_{16}Cl_2:Eu$ | 520 | 3.7 |
| (3b-1) | $Lu_3Al_5O_{12}:Ce$ | 520 | 41.7 |
| (4a-1) | $(Sr, Ca)AlSiN_3:Eu$ | 620 | 5.0 |
| (4f-1) | $(Ba, Sr)_2Si_5N_8:Eu$ | 600 | 5.0 |
| (5a-1) | $Ga_2O_3:Cr$ | 730 | 15.0 |
| (5g-1) | $Na_2CaGe_6O_{14}:Cr$ | 827 | 35.0 |

Figure 14:
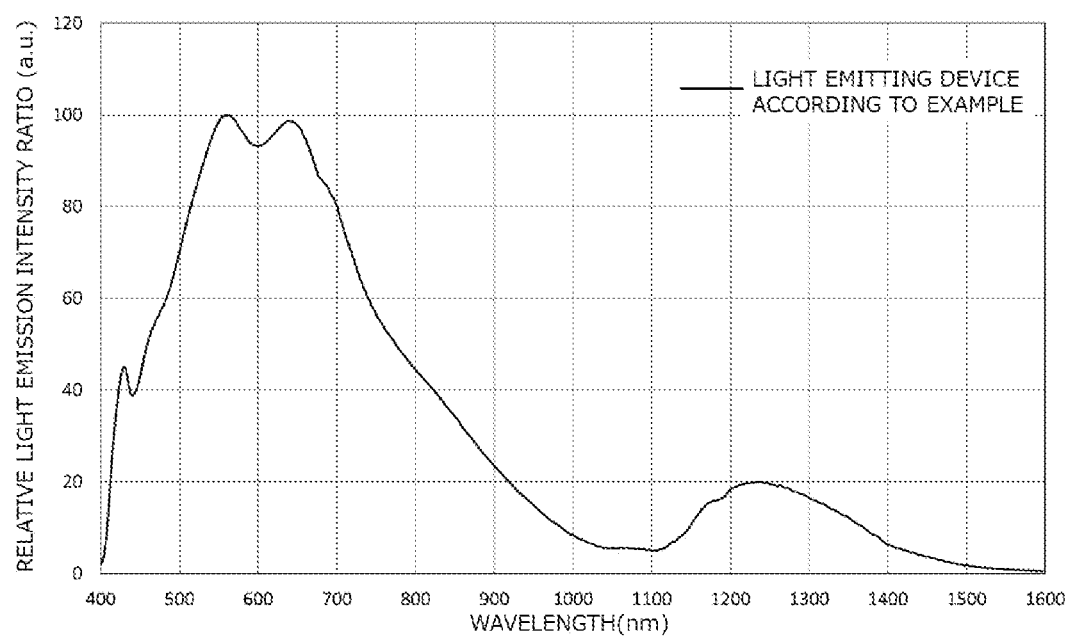
FIG. 14 is a diagram showing the light emission spectrum of the light emitting device according to Example.

FIG. 14 is a diagram showing the light emission spectrum of the light emitting device according to Example. As shown in FIG. 14, the light emission spectrum of the light emitting device according to Example was continuous in a range of the light emission peak wavelength of the light emitting element (420 nm or more and 1,600 nm or less).

The oxide fluorescent material according to the present disclosure can be used as a medical light emitting device for acquiring information in the living body a light emitting device mounted on a small sized mobile equipment, such as a smartphone, for managing the physical condition, a light emitting device for an analyzer for non-destructive measurement of information inside foods, such as fruit and vegetables, and rice, and a light emitting device of a reflectance spectroscopic measurement equipment used for measuring a film thickness or the like. The light emitting device using the oxide fluorescent material according to the present disclosure can be used in a medical equipment, a small sized mobile equipment, an analyzer, a reflectance spectroscopic measurement equipment, and the like.

The invention claimed is:

1. An oxide fluorescent material having a composition encompassed in a compositional formula represented by the following formula (1):

$$(Li_{1-t}M^1_t)_u(Ga_{1-v}M^2_v)_5O_w:Cr_x,Ni_y,M^3_z \quad (1)$$

wherein in the formula (1), $M^1$ represents at least one kind of an element selected from the group consisting of Na, K, Rb, and Cs; $M^2$ represents at least one kind of an element selected from the group consisting of B, Al, Sc, In, and a rare earth element; $M^3$ represents at least one kind of an element selected from the group consisting of Si, Ge, Sn, Ti, Zr, Hf, Bi, V, Nb, and Ta; and t, u, v, w, x, y, and z each satisfy $0 \le t \le 1.0$, $0.7 \le u \le 1.6$, $0 \le v \le 1.0$, $7.85 \le w \le 11.5$, $0.05 \le x \le 1.2$, $0 \le y \le 0.5$, $0.25 < x+y \le 1.2$, $y < x$, and $0 \le z \le 0.5$.

2. The oxide fluorescent material according to claim 1, wherein in the formula (1), x and y satisfy $0 < y \le 0.5$ and $1.5 \le x/y \le 50$.

3. The oxide fluorescent material according to claim 1, wherein in the formula (1), x and y satisfy $0.08 \le x \le 0.8$ and $0.001 \le y \le 0.3$.

4. The oxide fluorescent material according to claim 1, wherein in the formula (1), x and y satisfy $0.1 \le x \le 0.5$ and $0.005 \le y \le 0.2$.

5. The oxide fluorescent material according to claim 1, wherein the oxide fluorescent material has a full width at half maximum of a light emission spectrum having a light emission peak wavelength of 150 nm or more.

6. The oxide fluorescent material according to claim 1, wherein the oxide fluorescent material has a light emission peak wavelength in a range of 1,150 nm or more and 1,300 nm or less.

7. The oxide fluorescent material according to claim 1, wherein the oxide fluorescent material has a light emission peak wavelength in a range of 700 nm or more and 900 nm or less.

8. A light emitting device comprising the oxide fluorescent material according to claim 1 and a light emitting element that has a light emission peak wavelength in a range of 365 nm or more and 500 nm or less and irradiates the oxide fluorescent material.

* * * * *